United States Patent
Meng et al.

(10) Patent No.: US 12,475,704 B2
(45) Date of Patent: Nov. 18, 2025

(54) METHOD, SYSTEM, AND COMPUTER-READABLE MEDIUM FOR OBTAINING AGGREGATED MULTI-SCALE FIRST AND SECOND DIMENSIONAL RECEPTIVE FIELD INFORMATION

(71) Applicant: GUANGDONG OPPO MOBILE TELECOMMUNICATIONS CORP., LTD., Guangdong (CN)

(72) Inventors: Zibo Meng, Palo Alto, CA (US); Ming Chen, Palo Alto, CA (US); Chiuman Ho, Palo Alto, CA (US)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 684 days.

(21) Appl. No.: 17/896,993

(22) Filed: Aug. 26, 2022

(65) Prior Publication Data

US 2022/0406050 A1    Dec. 22, 2022

Related U.S. Application Data

(63) Continuation of application No. PCT/CN2021/075834, filed on Feb. 7, 2021.
(Continued)

(51) Int. Cl.
*G06V 20/40* (2022.01)
*G06N 3/045* (2023.01)
(Continued)

(52) U.S. Cl.
CPC .............. *G06V 20/41* (2022.01); *G06V 10/82* (2022.01); *G06V 30/2504* (2022.01);
(Continued)

(58) Field of Classification Search
CPC .... G06V 20/41; G06V 10/82; G06V 30/2504; G06V 10/50; G06V 10/40; G06V 10/806;
(Continued)

(56) References Cited

U.S. PATENT DOCUMENTS 9,832,351 B1    11/2017    Schoenblum
2022/0327815 A1*    10/2022    Picon Ruiz ............ G06V 10/82

FOREIGN PATENT DOCUMENTS

CN    107341462 A    11/2017
CN    109886090 A     6/2019
(Continued)

OTHER PUBLICATIONS

Jinzhuo Wang et al., NPL ("Multiscale Deep Alternative Neural Network for Large-Scale Video Classification" Published 2018 by IEEE (pp. 2578 to 2592) (Year: 2018).*
(Continued)

*Primary Examiner* — Quoc A Tran
(74) *Attorney, Agent, or Firm* — Young Basile Hanlon & MacFarlane, P.C.

(57) ABSTRACT

A method includes: aggregating information from a corresponding combination of all of multi-scale first dimensional receptive fields and each of multi-scale second dimensional receptive fields, so that information from multi-scale first and second dimensional receptive fields corresponding to the multi-scale second dimensional receptive fields is obtained; wherein the multi-scale first dimensional receptive fields being first dimensional is being one of spatial and temporal, and the multi-scale second dimensional receptive fields being second dimensional is being the other of spatial and temporal; wherein a corresponding first convolutional neural network operation set provides each of the multi-scale second dimensional receptive fields and each operation of the first convolutional neural network operation set has a
(Continued)

corresponding first dimensional local to local constraint; and aggregating the information from the multi-scale first and second dimensional receptive fields to obtain aggregated multi-scale first and second dimensional receptive field information.

18 Claims, 26 Drawing Sheets

Related U.S. Application Data

(60) Provisional application No. 62/983,369, filed on Feb. 28, 2020.

(51) Int. Cl.
```
G06N 3/08      (2023.01)
G06N 3/084     (2023.01)
G06V 10/40     (2022.01)
G06V 10/44     (2022.01)
G06V 10/50     (2022.01)
G06V 10/764    (2022.01)
G06V 10/80     (2022.01)
G06V 10/82     (2022.01)
G06V 30/24     (2022.01)
H04B 17/309    (2015.01)
```
(52) U.S. Cl.
CPC ........... *G06N 3/045* (2023.01); *G06N 3/08* (2013.01); *G06N 3/084* (2013.01); *G06T 2207/20084* (2013.01); *G06V 10/40* (2022.01); *G06V 10/454* (2022.01); *G06V 10/50* (2022.01); *G06V 10/764* (2022.01); *G06V 10/806* (2022.01); *H04B 17/309* (2015.01)

(58) Field of Classification Search
CPC ............ G06V 10/764; G06V 10/454; G06F 18/24133; G06N 3/084; G06N 3/08; G06N 3/045; G06T 2207/20084; H04B 17/309

See application file for complete search history.

(56) References Cited

FOREIGN PATENT DOCUMENTS

| CN | 110032926 A | 7/2019 |
|---|---|---|
| CN | 110378288 A | 10/2019 |

OTHER PUBLICATIONS

Zuxuan Wu et al., NPL ("Modeling Spatial-Temporal Clues in a Hybrid Deep Learning Framework for Video Classification" Published 2015 by ACM (pp. 461 to 470 (Year: 2015).*

International Search Report and Written Opinion for PCT Application PCT/CN2021/075834 mailed Apr. 29, 2021. (9 pages).

Zuxuan Wu et al,"Deep learning for video classification and captioning", Frontiers of Multimedia Research, Dec. 19, 2017. (116 pages).

Shuiwang Ji et al,"3D Convolutional Neural Networks for Human Action Recognition", IEEE Transactions on Pattern Analysis and Machine Intelligence, vol. 35, Issue 1, Jan. 2013. (221-231 pages).

Karpathy et al,"Large-scale Video Classification with Convolutional Neural Networks", Proceedings of the IEEE Conference on Computer Vision and Pattern Recognition (CVPR), Jan. 2014. (8 pages).

Du Tran et al,"Learning Spatiotemporal Features with 3D Convolutional Networks", ECS 289G, Oct. 27, 2016. (29 pages).

Qiu et al,"Learning Spatio-Temporal Representation with Pseudo-3D Residual Networks", Proceedings of the IEEE International Conference on Computer Vision, Nov. 28, 2017. (9 pages).

Carreira et al,"Quo Vadis, Action Recognition? A New Model and the Kinetics Dataset", Proceedings of the IEEE Conference on Computer Vision and Pattern Recognition, Feb. 12, 2018. (10 pages).

Simonyan et al,"Two-Stream Convolutional Networks for Action Recognition in Videos", Part of Advances in Neural Information Processing Systems 27, Nov. 12, 2014. (11 pages).

Wang et al,"Non-local Neural Networks", Proceedings of the IEEE Conference on Computer Vision and Pattern Recognition, Apr. 13, 2018. (10 pages).

Feichtenhofer et al,"SlowFast Networks for Video Recognition", Proceedings of the IEEE/CVF International Conference on Computer Vision, Oct. 29, 2019. (10 pages).

Kaiming He et al,"Spatial Pyramid Pooling in Deep Convolutional Networks for Visual Recognition", ECCV 2014, Part II,, LNCS 8691, 2014. (346-361 pages).

Carreira et al,"A Short Note about Kinetics-600", Computer Vision and Pattern Recognition, Aug. 3, 2018. (6 pages).

Zhang et al,"Multi-Scale Salient Object Detection with Pyramid Spatial Pooling", Asia-Pacific Signal and Information Processing Association Annual Summit and Conference, Dec. 12-15, 2017. (6 pages).

Wang et al,"Temporal Pyramid Pooling Based Convolutional Neural Network for Action Recognition", Temporal Pyramid Pooling Cnn for Action Recognition, Apr. 16, 2015. (8 pages).

Wang et al,"Salient Object Detection with Pyramid Attention and Salient Edges", Proceedings of the IEEE/CVF Conference on Computer Vision and Pattern Recognition, 2019. (1448-1457 pages).

Chinese First Office Action for Chinese Application No. 202180011875. X, mailed Oct. 18, 2024, 58 pages.

* cited by examiner

METHOD, SYSTEM, AND COMPUTER-READABLE MEDIUM FOR OBTAINING AGGREGATED MULTI-SCALE FIRST AND SECOND DIMENSIONAL RECEPTIVE FIELD INFORMATION

CROSS-REFERENCE TO RELATED APPLICATION(S)

The present application is a continuation of International Patent Application No. PCT/CN2021/075834, filed Feb. 7, 2021, the entire content of which is hereby incorporated by reference.

TECHNICAL FIELD

The present disclosure relates to the field of video understanding, and more particularly, to a method, a system and a computer-readable medium for obtaining aggregated multi-scale first and second dimensional receptive field information.

BACKGROUND

Video is an indispensable part of today's big data. Motivated by the advances in deep learning in image and speech, using deep learning techniques to understand video content has become one of the hottest topics. Video understanding involves analyzing a video segment and explaining what is happening inside of it. Video classification concentrates on automatically categorizing/labeling video clips based on their semantic contents like human actions or complex events.

SUMMARY

In a first aspect of the present disclosure, a computer-implemented method includes: aggregating information from a corresponding combination of all of multi-scale first dimensional receptive fields and each of multi-scale second dimensional receptive fields, so that information from multi-scale first and second dimensional receptive fields corresponding to the multi-scale second dimensional receptive fields is obtained; wherein the multi-scale first dimensional receptive fields being first dimensional is being one of spatial and temporal, and the multi-scale second dimensional receptive fields being second dimensional is being the other of spatial and temporal; wherein a corresponding first convolutional neural network operation set provides each of the multi-scale second dimensional receptive fields and each operation of the first convolutional neural network operation set has a corresponding first dimensional local to local constraint; and aggregating the information from the multi-scale first and second dimensional receptive fields to obtain aggregated multi-scale first and second dimensional receptive field information.

In a second aspect of the present disclosure, a system includes at least one memory and a processor module. The at least one memory is configured to store program instructions. The processor module is configured to execute the program instructions, which cause the processor module to perform steps including: aggregating information from a corresponding combination of all of multi-scale first dimensional receptive fields and each of multi-scale second dimensional receptive fields, so that information from multi-scale first and second dimensional receptive fields corresponding to the multi-scale second dimensional receptive fields is obtained; wherein the multi-scale first dimensional receptive fields being first dimensional is being one of spatial and temporal, and the multi-scale second dimensional receptive fields being second dimensional is being the other of spatial and temporal; wherein a corresponding first convolutional neural network operation set provides each of the multi-scale second dimensional receptive fields and each operation of the first convolutional neural network operation set has a corresponding first dimensional local to local constraint; and aggregating the information from the multi-scale first and second dimensional receptive fields to obtain aggregated multi-scale first and second dimensional receptive field information.

In a third aspect of the present disclosure, a non-transitory computer-readable medium with program instructions stored thereon is provided. When the program instructions are executed by a processor module, the processor module is caused to perform steps including: aggregating information from a corresponding combination of all of multi-scale first dimensional receptive fields and each of multi-scale second dimensional receptive fields, so that information from multi-scale first and second dimensional receptive fields corresponding to the multi-scale second dimensional receptive fields is obtained; wherein the multi-scale first dimensional receptive fields being first dimensional is being one of spatial and temporal, and the multi-scale second dimensional receptive fields being second dimensional is being the other of spatial and temporal; wherein a corresponding first convolutional neural network operation set provides each of the multi-scale second dimensional receptive fields and each operation of the first convolutional neural network operation set has a corresponding first dimensional local to local constraint; and aggregating the information from the multi-scale first and second dimensional receptive fields to obtain aggregated multi-scale first and second dimensional receptive field information.

BRIEF DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION

Figure 1A:
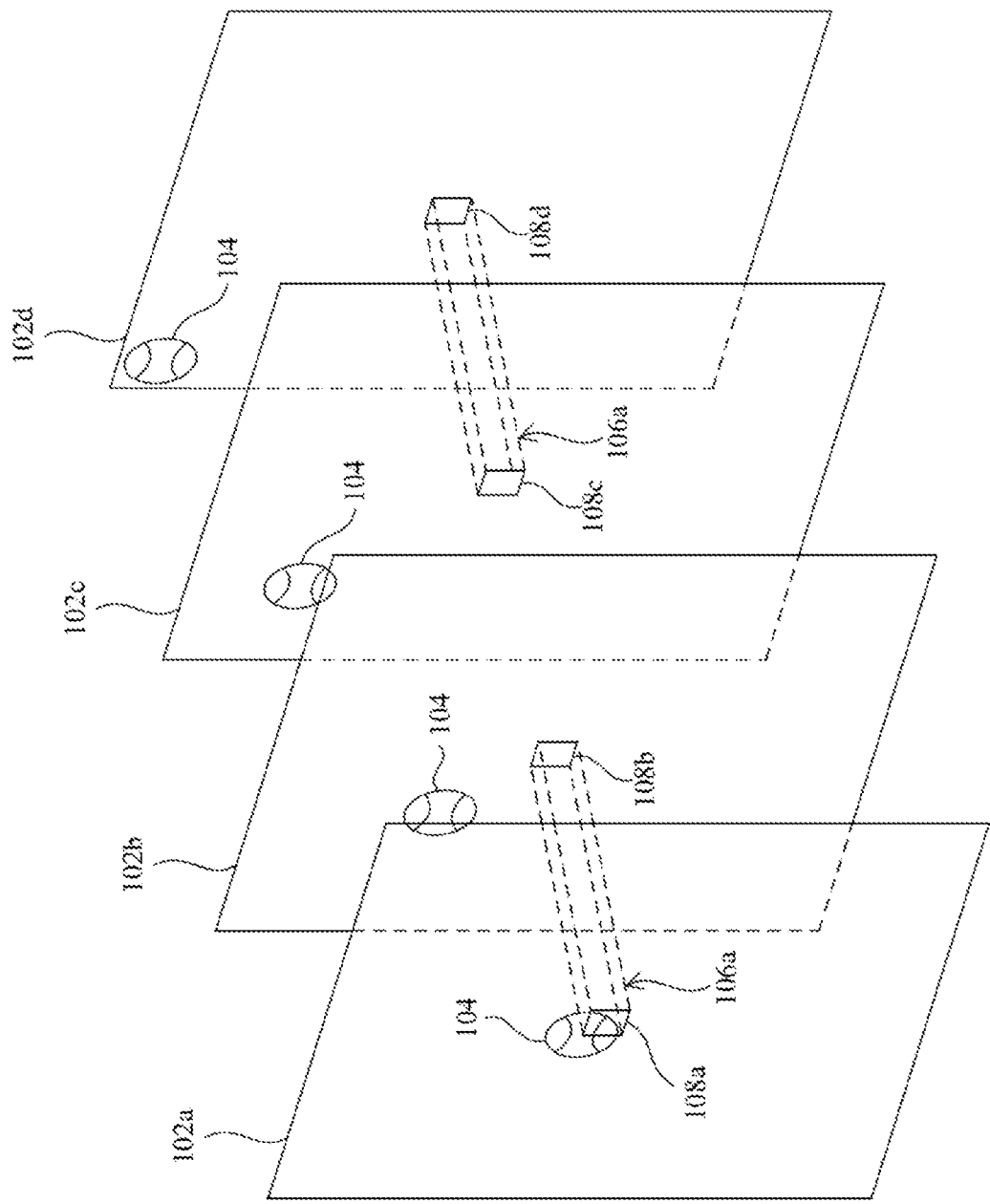
FIGS. 1A and 1B are schematic diagrams illustrating corresponding operations of the first convolutional neural network operation set each of which has a spatial local to local constraint when being performed on an input feature map sequence for obtaining temporal importance.

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the invention.

Same reference numerals among different figures indicate substantially the same elements for one of which description is applicable to the others.

As used here, the term "performing at least one operation using at least one object" refers to a case in which the at least one object is directly employed for performing the at least one operation, or a case in which the at least one object is modified by at least one intervening operation and the modified at least one object is directly employed to perform the at least one operation.

As used here, the term "at least one object is obtained using a mechanism" refers to the step of obtaining the at least one object comprising performing the mechanism.

As used here, the term "performing at least one operation on at least one object" refers to a case in which the at least one object is directly employed for performing the at least one operation.

As used here, the term "performing at least one operation to achieve a result" refers to a case in which the at least one operation is performed to directly achieve the result, or a case in which at least one intervening operation exists after the at least one operation to achieve the result.

In related art, when there are a great many irrelevant or trivial information included in each frame of a video clip, video classification does not consider it irrelevant or trivial, which affects classification accuracy. Some embodiments of the present disclosure obtain second dimensional importance for enforcing a computer vision convolutional neural network (CNN) to focus on important regions in a second dimensional domain. Each operation of the first convolutional neural network operation set performed for obtaining the second dimensional importance has a first dimensional local to local constraint. Being first dimensional may be being one of spatial and temporal, and being second dimensional may be being another of spatial and temporal.

Figure 1B:
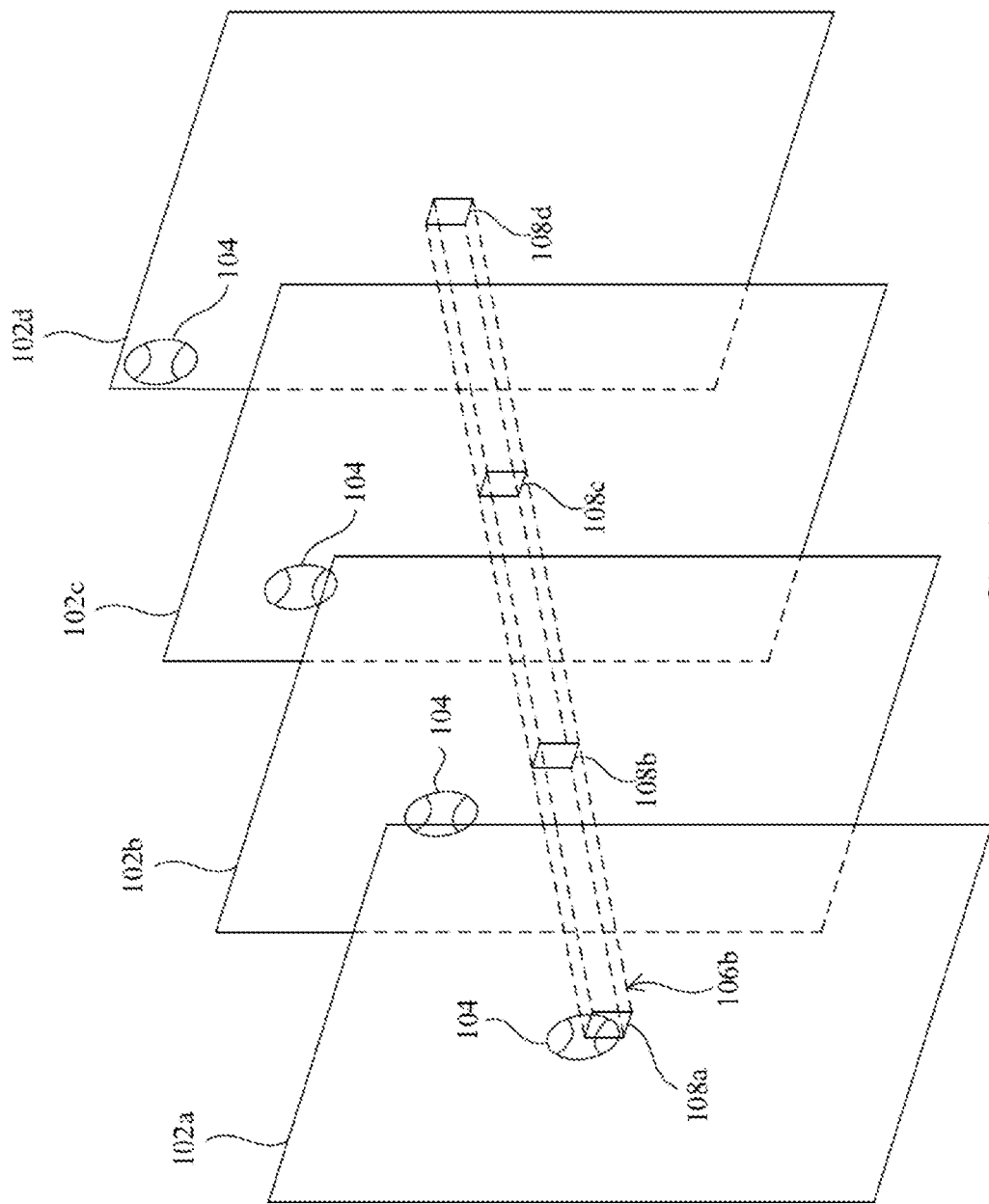

FIGS. 1A and 1B are schematic diagrams illustrating corresponding operations 106a and 106b of the first convolutional neural network operation set each of which has a spatial local to local constraint when being performed on an input feature map sequence 102 for obtaining temporal importance. The first convolutional neural network operation set includes the operation 106a in FIG. 1A and the operation 106b in FIG. 1B which are performed on the input feature map sequence 102 for obtaining the temporal importance. In the example in FIGS. 1A and 1B, the input feature map sequence 102 has a size of T×H×W, where T, H, and W denotes the time, height, and width dimensions, respectively. The operation 106a and the operation 106b of the first convolutional neural network operation set are temporal pooling operations that have a pooling window size of T/2, and a pooling window size of T, respectively. Each operation 106a or 106b of the first convolutional neural network operation set has the corresponding spatial local to local constraint. That is, when the operation 106a of the first convolutional neural network operation set is performed on the input feature map sequence 102, because of a scale of a single original scale spatial portion of a spatiotemporal receptive field of the operation 106a of the first convolutional neural network operation set, the operation 106a of the first convolutional neural network operation set sees only collocated local spatial regions 108a and 108b at a time and only collocated local spatial regions 108c and 108d in the input feature map sequence 102 at a time. When the operation 106b of the first convolutional neural network operation set is performed on the input feature map sequence 102, because of a scale of a single original scale spatial portion of a spatiotemporal receptive field of the operation 106b of the first convolutional neural network operation set, the operation 106b of the first convolutional neural network operation set sees only collocated local spatial regions 108a, 108b, 108c, and 108d in the input feature map sequence 102 at a time. The local spatial regions 108a, 108b, 108c, and 108d are corresponding original spatial regions of the input feature map sequence 102. In the example in FIGS. 1A and 1B, the collocated local spatial regions are collocated pixels. A baseball 104 flies from a center of a video frame corresponding to an input feature map 102a in the input feature map sequence 102 to an upper left corner of a video frame corresponding to an input feature map 102d in the input feature map sequence 102. Therefore, the operation 106b of the first convolutional neural network operation set that has the pooling window size of T provides context that has a more suitable temporal scale than a temporal scale of context provided by the operation 106a of the first convolutional neural network operation set that has the pooling window size of T/2. However, because of the spatial local to local constraint for the operation 106b of the first convolutional neural network operation set, the operation 106b of the first convolutional neural network operation set is not aware of an entire flying trajectory of the baseball 104 in the video frames corresponding to the input feature maps 102a, 102b, 102c, and 102d. One advantage of some embodiments of the present disclosure is that context with at least one more suitable spatiotemporal scale may be obtained when obtaining temporal importance, so that classification accuracy is improved. In the above example, the context with the more suitable spatiotemporal scale may reflect the entire flying trajectory of the baseball 104 in the corresponding video frames corresponding to the input feature maps 102a, 102b, 102c, and 102d.

Figure 2A:
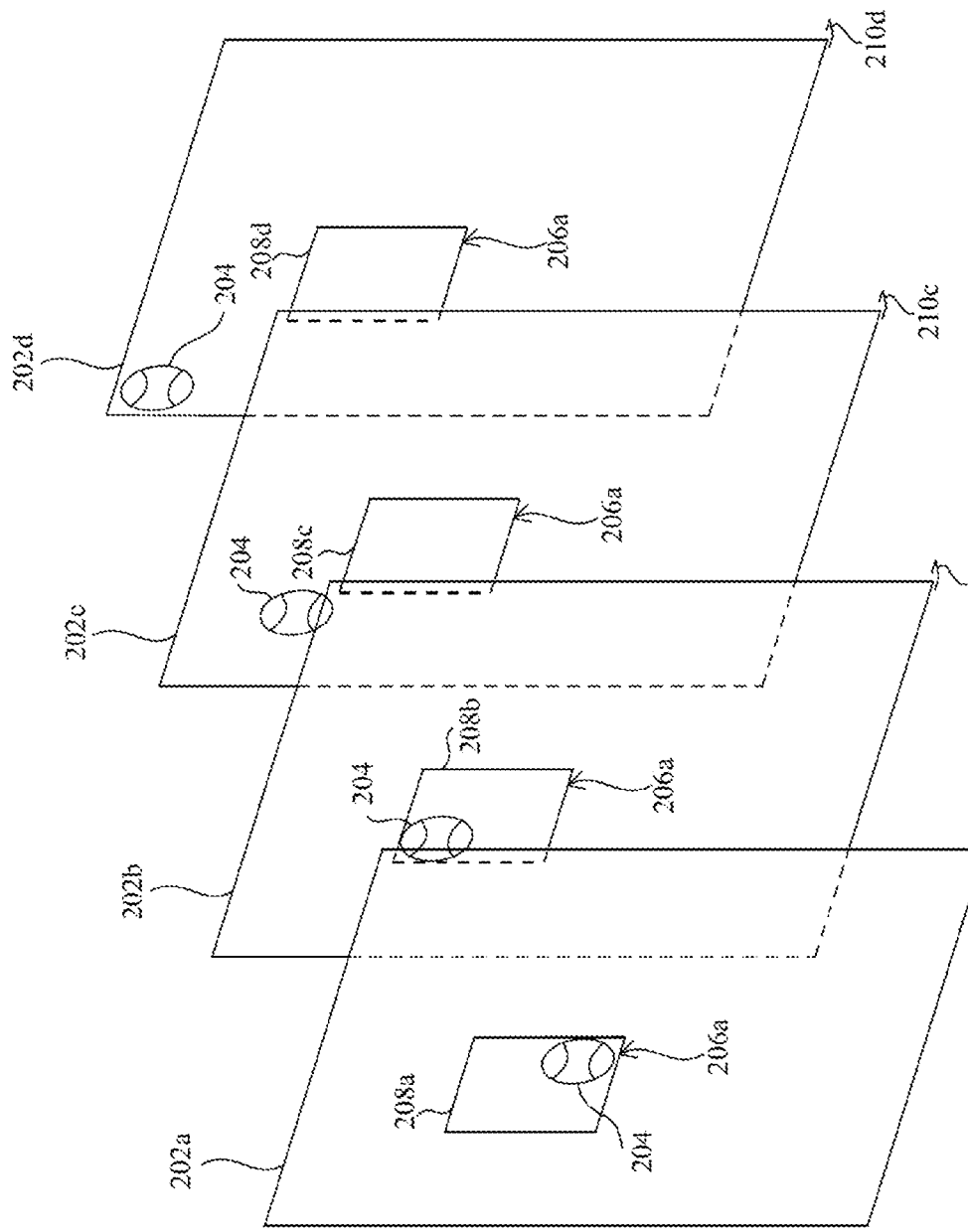
FIGS. 2A and 2B are schematic diagrams illustrating corresponding operations of the first convolutional neural network operation set each of which has a temporal local to local constraint when being performed on an input feature map sequence for obtaining spatial importance.
Figure 2B:
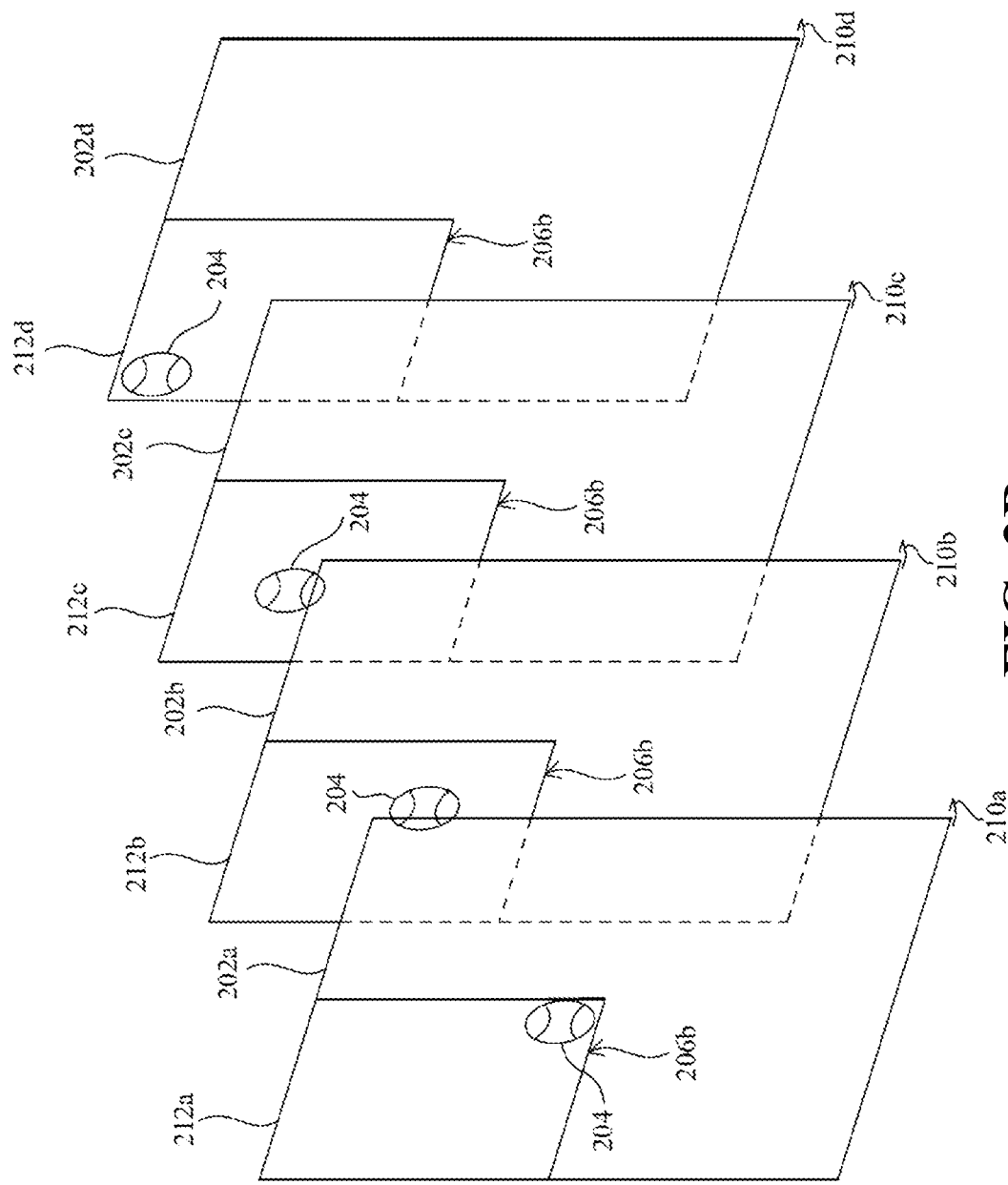

FIGS. 2A and 2B are schematic diagrams illustrating corresponding operations 206a and 206b of the first convolutional neural network operation set each of which has a temporal local to local constraint when being performed on an input feature map sequence 202 for obtaining spatial importance. The first convolutional neural network operation set includes the operation 206a in FIG. 2A and the operation 206b in FIG. 2B which are performed on the input feature map sequence 202 for obtaining the spatial importance. In the example in FIGS. 2A and 2B, the input feature map sequence 102 has a size of T×H×W, where T, H, and W denotes the time, height, and width dimensions, respectively. The operation 206a and the operation 206b of the first convolutional neural network operation set are spatial pooling operations that have a pooling window size of (H/4)×(H/4), and a pooling window size of (H/2)×(H/2), respectively. Each operation 206a or 206b of the first convolutional neural network operation set has the corresponding temporal local to local constraint. That is, when the operation 206a of the first convolutional neural network operation set is performed on the input feature map sequence 202, because of a scale of a single original scale temporal portion of a spatiotemporal receptive field of the operation 206a of the first convolutional neural network operation set, the operation 206a of the first convolutional neural network operation set sees only the spatial region 208a corresponding to a local temporal portion 210a of the input feature map sequence 202 at a time, only the spatial region 208b corresponding to a local temporal portion 210b of the input feature map sequence 202 at a time, only the spatial region 208c corresponding to a local temporal portion 210c of the input feature map sequence 202 at a time, and only the spatial region 208d corresponding to a local temporal portion 210d of the input feature map sequence 202 at a time. When the operation 206b of the first convolutional neural network operation set is performed on the input feature map sequence 202, because of a scale of a single original scale temporal portion of a spatiotemporal receptive field of the operation 206b of the first convolutional neural network operation set, the operation 206b of the first convolutional neural network operation set sees only the spatial region 212a corresponding to a local temporal portion 210a of the input feature map sequence 202 at a time, only the spatial region 212b corresponding to a local temporal portion 210b of the input feature map sequence 202 at a time, only the spatial region 212c corresponding to a local temporal portion 210c of the input feature map sequence 202 at a time, and only the spatial region 212d corresponding to a local temporal portion 210d of the input feature map sequence 202 at a time. The local temporal portions 210a, 210b, 210c, and 210d are corresponding original temporal portions of the input feature map sequence 202. In the example in FIGS. 2A and 2B, each of the local temporal portions has a size of T/T. A baseball 204 flies from a center of a video frame corresponding to an input feature map 202a in the input feature map sequence 202 to an upper left corner of a video frame corresponding to an input feature map 202d in the input feature map sequence 202. Therefore, the operation 206b of the first convolutional neural network operation set that has the pooling window size of (H/2)×/2) provides context that has a more suitable spatial scale than a spatial scale of context provided by the operation 206a of the first convolutional neural network operation set that has the pooling window size of (H/4)×/4). However, because of the temporal local to local constraint of the operation 206b of the first convolutional neural network operation set, the operation 206b of the first convolutional neural network operation set is not aware of an entire flying trajectory of the baseball 204 in the video frame corresponding to input feature maps 202a, 202b, 202c, and 202d. One advantage of some embodiments of the present disclosure is that context with at least one more suitable spatiotemporal scale may be obtained when obtaining spatial importance, so that classification accuracy is improved. In the above example, the context with the more suitable spatiotemporal scale may reflect the entire flying trajectory of the baseball 204 in the corresponding video frames corresponding to the input feature maps 202a, 202b, 202c, and 202d.

Figure 3A:
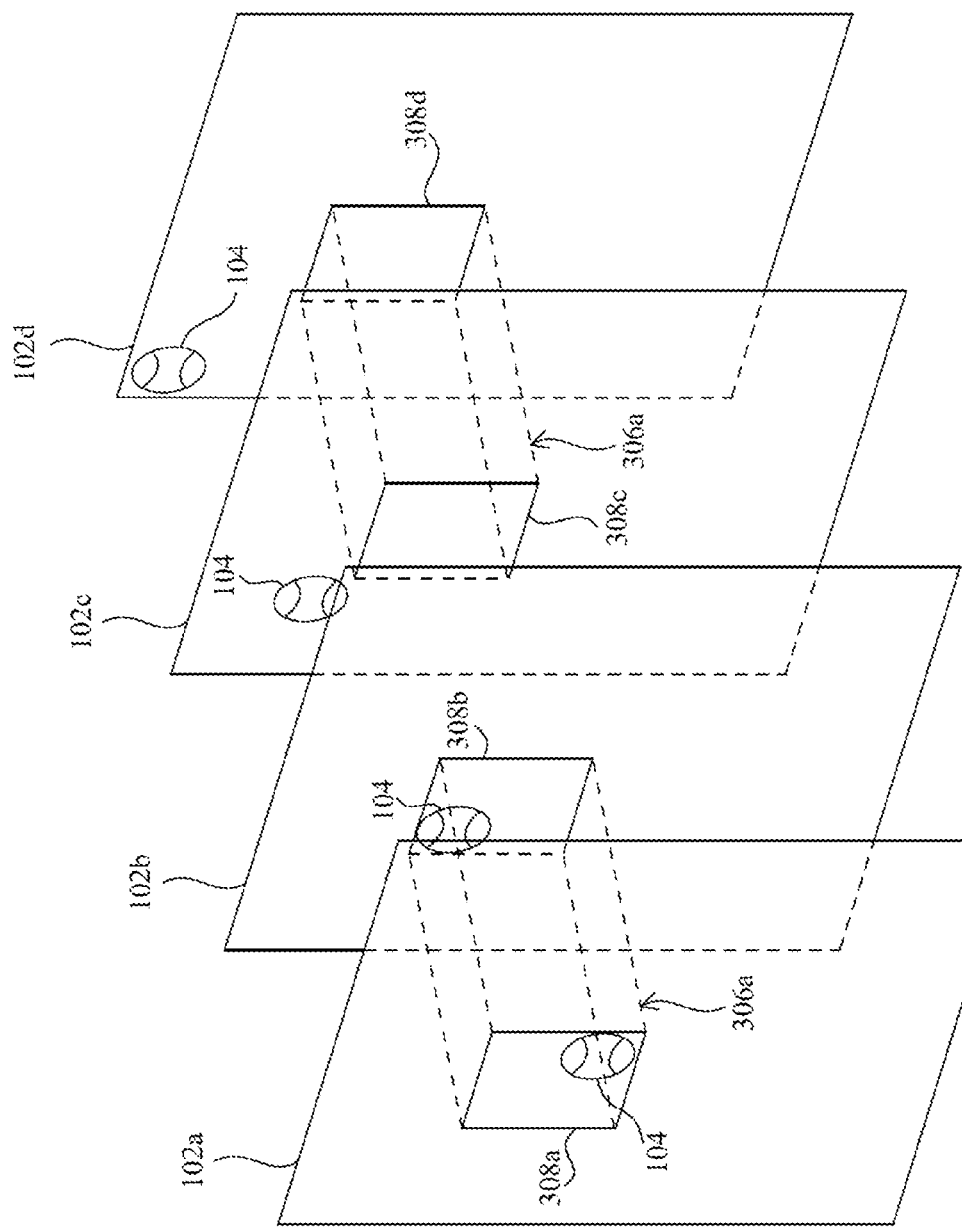
FIGS. 3A and 3B are schematic diagrams illustrating corresponding operations of the first convolutional neural network operation set each of which has a spatial local to local constraint when being performed on an input feature map sequence for obtaining temporal importance.
Figure 3B:
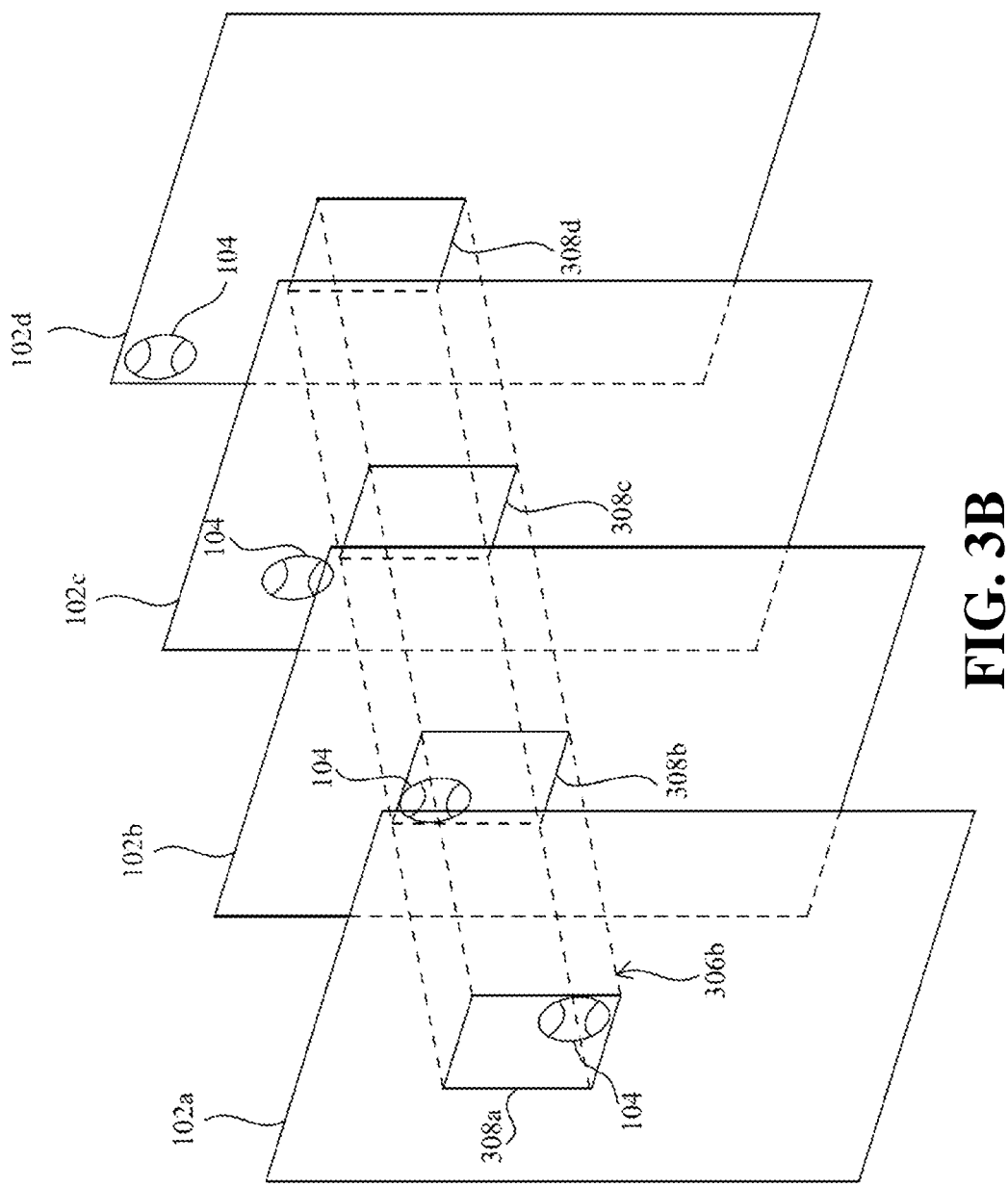

FIGS. 3A and 3B are schematic diagrams illustrating corresponding operations 306a and 306b of the first convolutional neural network operation set each of which has a spatial local to local constraint when being performed on an input feature map sequence 102 for obtaining temporal importance. Compared to the example in FIGS. 1A and 1B, the example in FIGS. 3A and 3B has the following difference. The operation 306a and the operation 306b of the first convolutional neural network operation set are 3D pooling operations that correspondingly have a pooling window size of (T/2)×(H/4)×(W/4), and a pooling window size of (T)×(H/4)×(W/4), respectively. For the spatial local to local constraint for the operation 306a of the first convolutional neural network operation set, collocated local spatial regions 308a and 308b are collocated (H/4)×(W/4) regions, and collocated local spatial regions 308c and 308d are collocated (H/4)×(W/4) regions. For the spatial local to local constraint for the operation 306b of the first convolutional neural network operation set, collocated local spatial regions 308a, 308b, 308c, and 308d are collocated (H/4)×(W/4) regions. The local spatial regions 308a, 308b, 308c, and 308d are corresponding original spatial regions of the input feature map sequence 102. Similar to the example in FIGS. 1A and 1B, the operation 306b of the first convolutional neural network operation set that has the pooling window size of T provides context that has a more suitable temporal scale than a temporal scale of context provided by the operation 306a of the first convolutional neural network operation set that has the pooling window size of T/2. However, because of the spatial local to local constraint for the operation 306b of the first convolutional neural network operation set, the operation 306b of the first convolutional neural network operation set is not aware of an entire flying trajectory of the baseball 104 in the video frames corresponding to the input feature maps 102a, 102b, 102c, and 102d. One advantage of some embodiments of the present disclosure is that context with at least one more suitable spatiotemporal scale may be obtained when obtaining temporal importance, so that classification accuracy is improved. In the above example, the context with the more suitable spatiotemporal scale may reflect the entire flying trajectory of the baseball 104 in the corresponding video frames corresponding to the input feature maps 102a, 102b, 102c, and 102d.

Figure 4A:
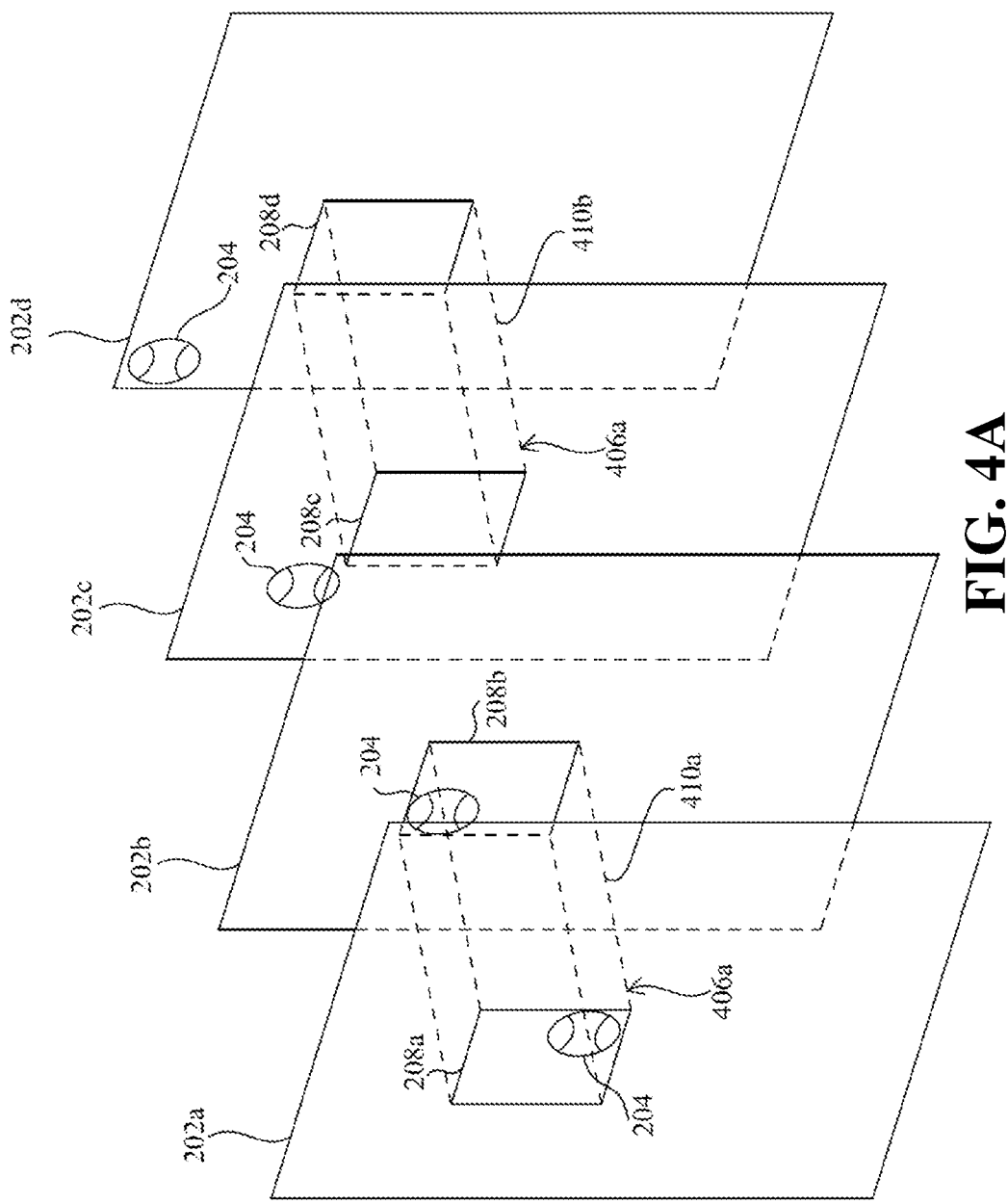
FIGS. 4A and 4B are schematic diagrams illustrating corresponding operations of the first convolutional neural network operation set each of which has a temporal local to local constraint when being performed on an input feature map sequence for obtaining spatial importance.
Figure 4B:
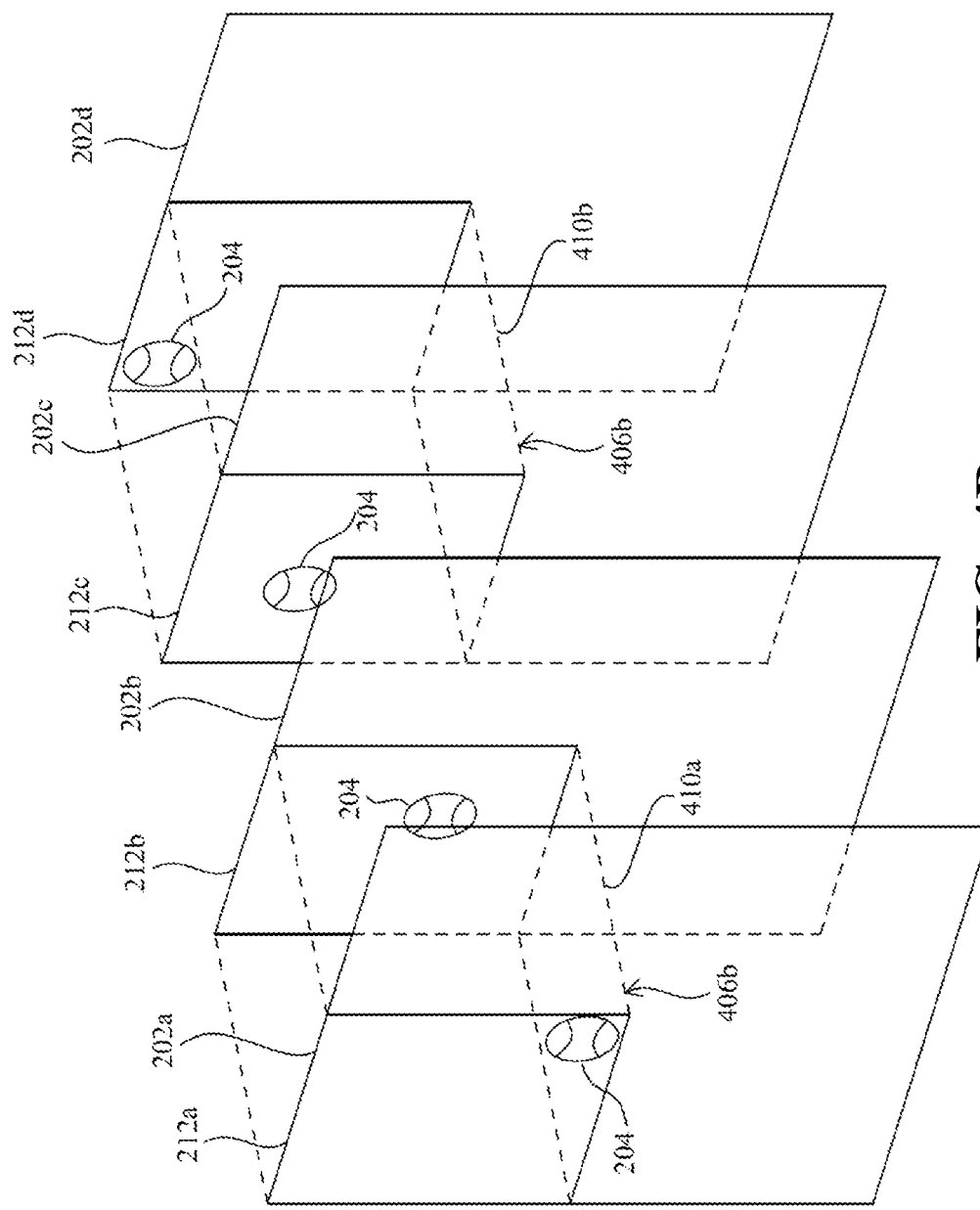

FIGS. 4A and 4B are schematic diagrams illustrating corresponding operations 406a and 406b of the first convolutional neural network operation set each of which has a temporal local to local constraint when being performed on an input feature map sequence 202 for obtaining spatial importance. Compared to the example in FIGS. 2A and 2B, the example in FIGS. 4A and 4B has the following difference. The operation 406a and the operation 406b of the first convolutional neural network operation set are 3D pooling operations that have a pooling window size of (T/2)×(H/4)×(W/4), and a pooling window size of (T/2)×(H/2)×(W/2), respectively. For the temporal local to local constraint for the operation 406a of the first convolutional neural network operation set, a local temporal portion 410a of the input feature map sequence 202 has a size of T/2, and A local temporal portion 410b of the input feature map sequence 202 has a size of T/2. For the temporal local to local constraint for the operation 406b of the first convolutional neural network operation set, a local temporal portion 410a of the input feature map sequence 202 has a size of T/2, and A local temporal portion 410b of the input feature map sequence 202 has a size of T/2. The local temporal portions 410a, 410b are corresponding original temporal portions of the input feature map sequence 202. Similar to the example in FIGS. 2A and 2B, the operation 406b of the first convolutional neural network operation set that has the pooling window size of (H/2)×/2) provides context that has a more suitable spatial scale than a spatial scale of context provided by the operation 406a of the first convolutional neural network operation set that has the pooling window size of (H/4)×/4). However, because of the temporal local to local constraint of the operation 406b of the first convolutional neural network operation set, the operation 406b of the first convolutional neural network operation set is not aware of an entire flying trajectory of the baseball 204 in the video frame corresponding to input feature maps 202a, 202b, 202c, and 202d. One advantage of some embodiments of the present disclosure is that context with at least one more suitable spatiotemporal scale may be obtained when obtaining spatial importance, so that classification accuracy is improved. In the above example, the context with the more suitable spatiotemporal scale may reflect the entire flying trajectory of the baseball 204 in the corresponding video frames corresponding to the input feature maps 202a, 202b, 202c, and 202d.

Figure 5:
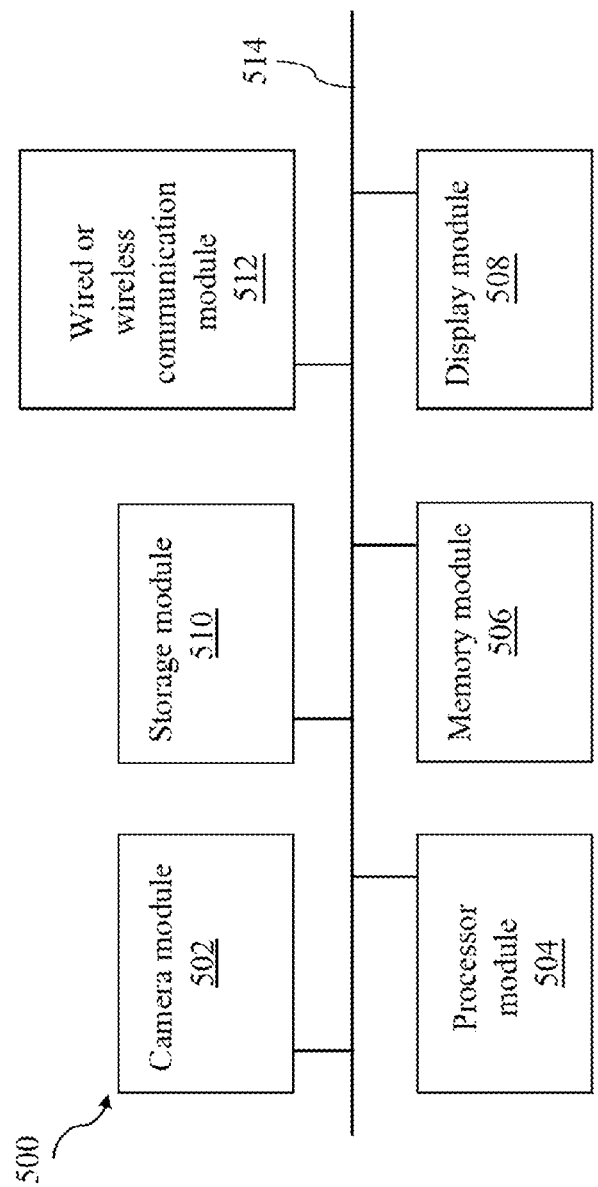
FIG. 5 is a block diagram illustrating inputting, processing, and outputting hardware modules in a terminal in accordance with an embodiment of the present disclosure.

FIG. 5 is a block diagram illustrating inputting, processing, and outputting hardware modules in a terminal 500 in accordance with an embodiment of the present disclosure. Referring to FIG. 5, the terminal 500 includes a camera module 502, a processor module 504, a memory module 506, a display module 508, a storage module 510, a wired or wireless communication module 512, and buses 514. The terminal 500 may be cell phones, smart phones, tablets, notebook computers, desktop computers, or any electronic device having enough computing power to perform video understanding.

The camera module 502 is an inputting hardware module and is configured to capture a video clip 2002 (exemplarily labeled in FIG. 20) that is to be transmitted to the processor module 504 through the buses 514. The camera module 502 includes an RGB camera, or a grayscale camera. Alternatively, the video clip 2002 may be obtained using another inputting hardware module, such as the storage module 510, or the wired or wireless communication module 512. The storage module 510 is configured to store the video clip 2002 that is to be transmitted to the processor module 504 through the buses 514. The wired or wireless communication module 512 is configured to receive the video clip 2002 from a network through wired or wireless communication, wherein the video clip 2002 is to be transmitted to the processor module 504 through the buses 514.

Figure 20:
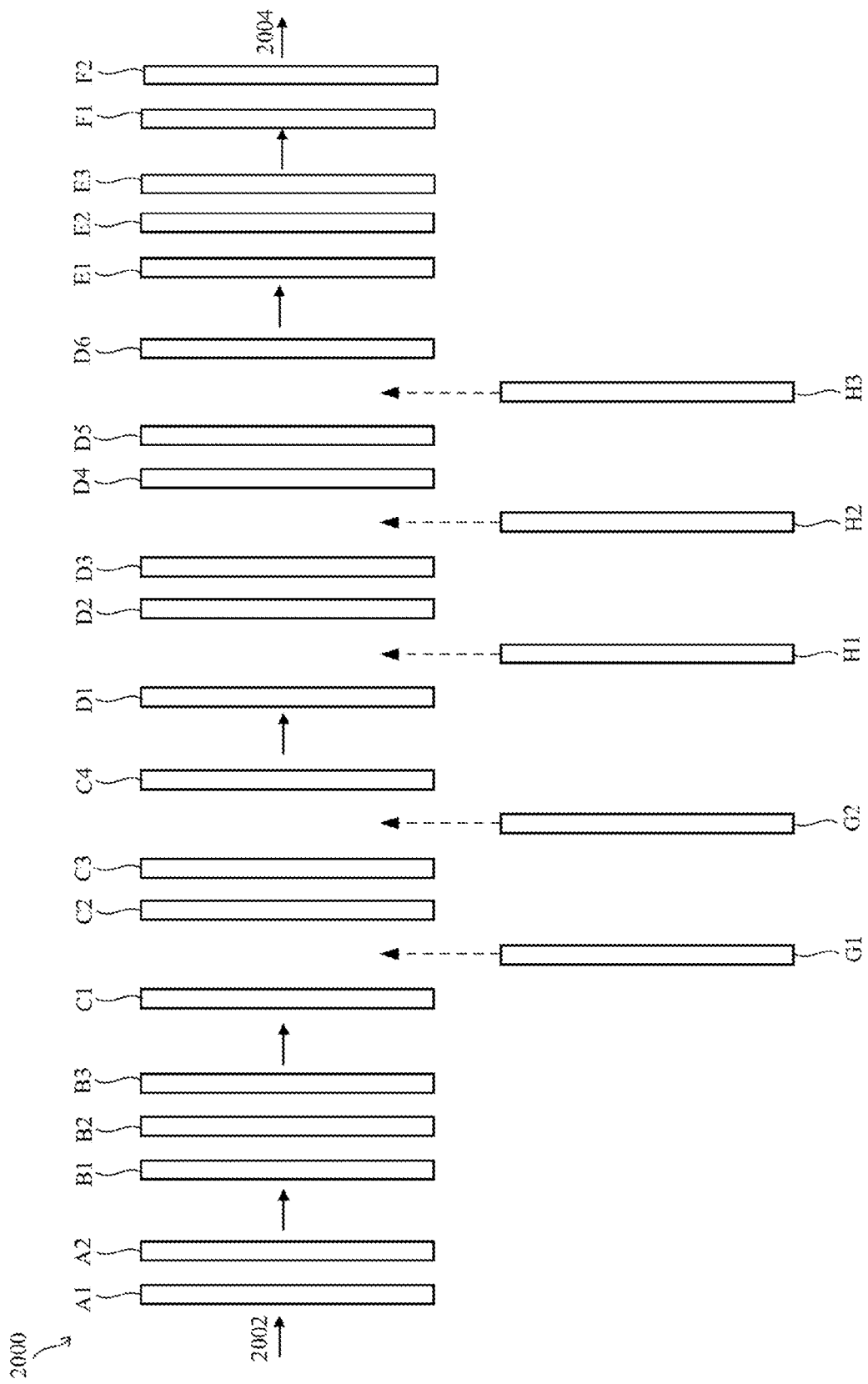
FIG. 20 is a schematic diagram illustrating the separable 3D Resnet-50 network with a plurality of aggregated multi-scale first and second dimensional receptive field information and multi-scale first dimensional receptive field information obtaining modules in accordance with an embodiment of the present disclosure.

The memory module 506 stores inference stage program instructions, and the inference stage program instructions are executed by the processor module 504, which causes the processor module 504 to implement a computer vision CNN (such as a separable 3D Resnet-50 network 2000 with a plurality of aggregated multi-scale first and second dimensional receptive field information and multi-scale first dimensional receptive field information obtaining modules G1 to G2, and H1 to H3 to be described with reference to FIG. 20) for processing the video clip 2002. The memory module 506 may be a transitory or non-transitory computer-readable medium that includes at least one memory. The processor module 504 includes at least one processor that sends signals directly or indirectly to and/or receives signals directly or indirectly from the camera module 502, the memory module 506, the display module 508, the storage module 510, and the wired or wireless communication module 512 via the buses 514. The at least one processor may be central processing unit(s) (CPU(s)), graphics processing unit(s) (GPU(s)), and/or digital signal processor(s) (DSP(s)). The CPU(s) may send the facial image 508, some of the program instructions and other data or instructions to the GPU(s), and/or DSP(s) via the buses 514.

The display module 508 is an outputting hardware module and is configured to display a result obtained by the computer vision CNN. Alternatively, the result obtained by the computer vision CNN may be output using another outputting hardware module, such as the storage module 510, or the wired or wireless communication module 512. The storage module 510 is configured to store the result obtained by the computer vision CNN. The wired or wireless communication module 512 is configured to transmit the result obtained by the computer vision CNN to the network through wired or wireless communication. The result obtained by the computer vision CNN is received from the processor module 504 through the buses 514.

In the above embodiment, the terminal 500 is one type of computing system all of components of which are integrated together by the buses 514. Other types of computing systems such as a computing system that has a remote camera module instead of the camera module 502 are within the contemplated scope of the present disclosure.

Figure 6:
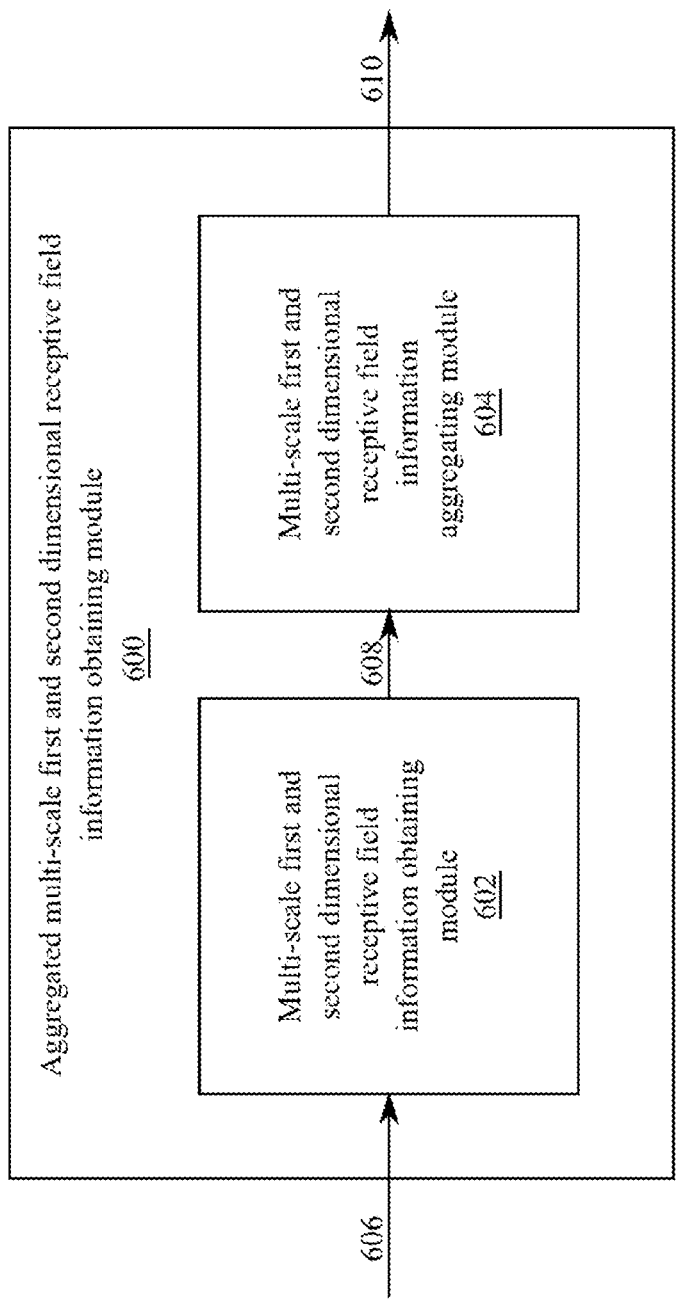
FIG. 6 is a block diagram illustrating an aggregated multi-scale first and second dimensional receptive field information obtaining module in accordance with an embodiment of the present disclosure.

FIG. 6 is a block diagram illustrating an aggregated multi-scale first and second dimensional receptive field information obtaining module 600 in accordance with an embodiment of the present disclosure. By applying the aggregated multi-scale first and second dimensional receptive field information obtaining module 600 to the computer vision CNN, the computer vision CNN is enforced to focus on first dimensional context enhanced-important regions in a second dimensional domain. Throughout the present disclosure, being first dimensional may be being one of spatial and temporal, and being second dimensional may be being another of spatial and temporal. The aggregated multi-scale first and second dimensional receptive field information obtaining module 600 is configured to obtain aggregated multi-scale first and second dimensional receptive field information 610 using an input feature map sequence 606. The aggregated multi-scale first and second dimensional receptive field information obtaining module 600 includes a multi-scale first and second dimensional receptive field information obtaining module 602 and a multi-scale first and second dimensional receptive field information aggregating module 604.

The multi-scale first and second dimensional receptive field information obtaining module 602 is configured to aggregate information from a corresponding combination of all of multi-scale first dimensional receptive fields and each of multi-scale second dimensional receptive fields using the input feature map sequence 606, so that information 608 from multi-scale first and second dimensional receptive fields corresponding to the multi-scale second dimensional receptive fields is obtained. The multi-scale first and second dimensional receptive field information obtaining module 602 performs a corresponding first convolutional neural network operation set that provides each of the multi-scale second dimensional receptive fields. Each operation of the first convolutional neural network operation set has a corresponding first dimensional local to local constraint.

The multi-scale first and second dimensional receptive field information aggregating module 604 is configured to aggregate the information 608 from the multi-scale first and second dimensional receptive fields to obtain the aggregated multi-scale first and second dimensional receptive field information 610.

Figure 7:
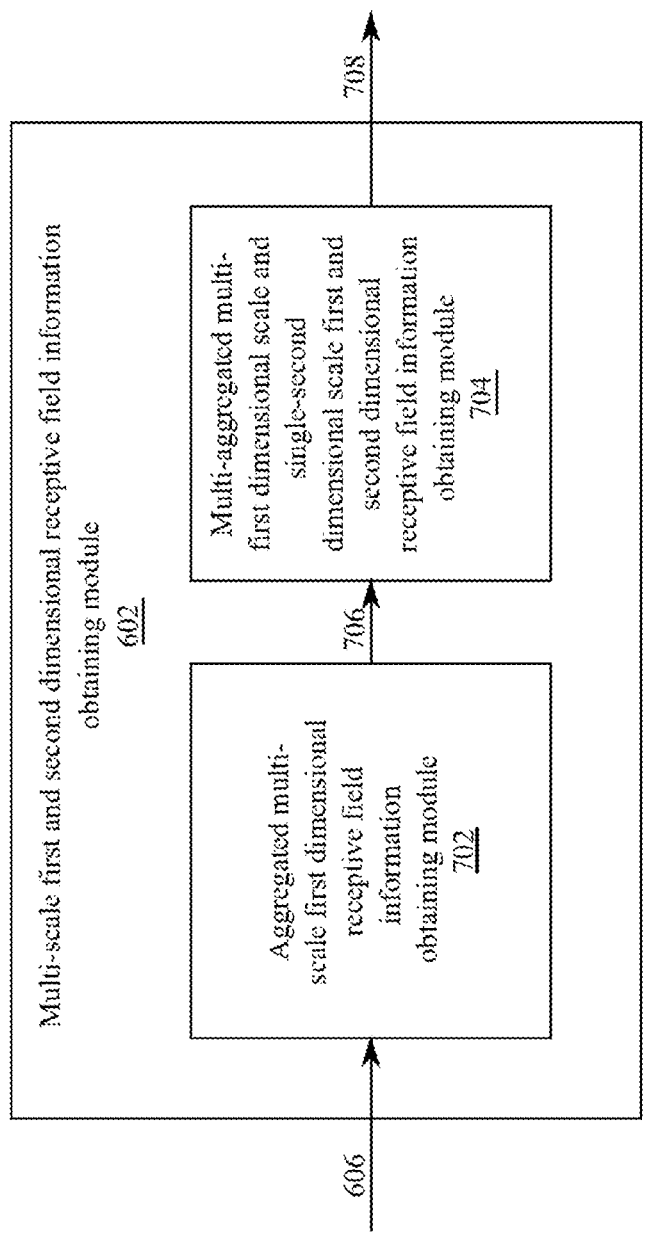
FIG. 7 is a block diagram illustrating the multi-scale first and second dimensional receptive field information obtaining module in FIG. 6 including modules in FIG. 7 in accordance with an embodiment of the present disclosure.

FIG. 7 is a block diagram illustrating the multi-scale first and second dimensional receptive field information obtaining module 602 in FIG. 6 including modules 702 and 704 in FIG. 7 in accordance with an embodiment of the present disclosure. The multi-scale first and second dimensional receptive field information obtaining module 602 includes an aggregated multi-scale first dimensional receptive field information obtaining module 702 and a multi-aggregated multi-first dimensional scale and single-second dimensional scale first and second dimensional receptive field information obtaining module 704.

The aggregated multi-scale first dimensional receptive field information obtaining module 702 is configured to perform at least one second convolutional neural network operation using the input feature map sequence 606 to obtain aggregated multi-scale first dimensional receptive field information 706. The corresponding at least one second convolutional neural network operation provides at least one of the multi-scale first dimensional receptive fields, wherein the at least one of the multi-scale first dimensional receptive fields is larger than the smallest scale of the multi-scale first dimensional receptive fields.

The multi-aggregated multi-first dimensional scale and single-second dimensional scale first and second dimensional receptive field information obtaining module 704 is configured to perform each of a plurality of third convolutional neural network operations using the aggregated multi-scale first dimensional receptive field information 706 to obtain corresponding aggregated multi-first dimensional scale and single-second dimensional scale first and second dimensional receptive field information 708. Each first convolutional neural network operation set is the corresponding third convolutional neural network operation providing the corresponding one of the multi-scale second dimensional receptive fields. The corresponding aggregated multi-first dimensional scale and single-second dimensional scale first and second dimensional receptive field information 708 for all of the third convolutional neural network operations is the information 608 from the multi-scale first and second dimensional receptive fields.

Figure 8:
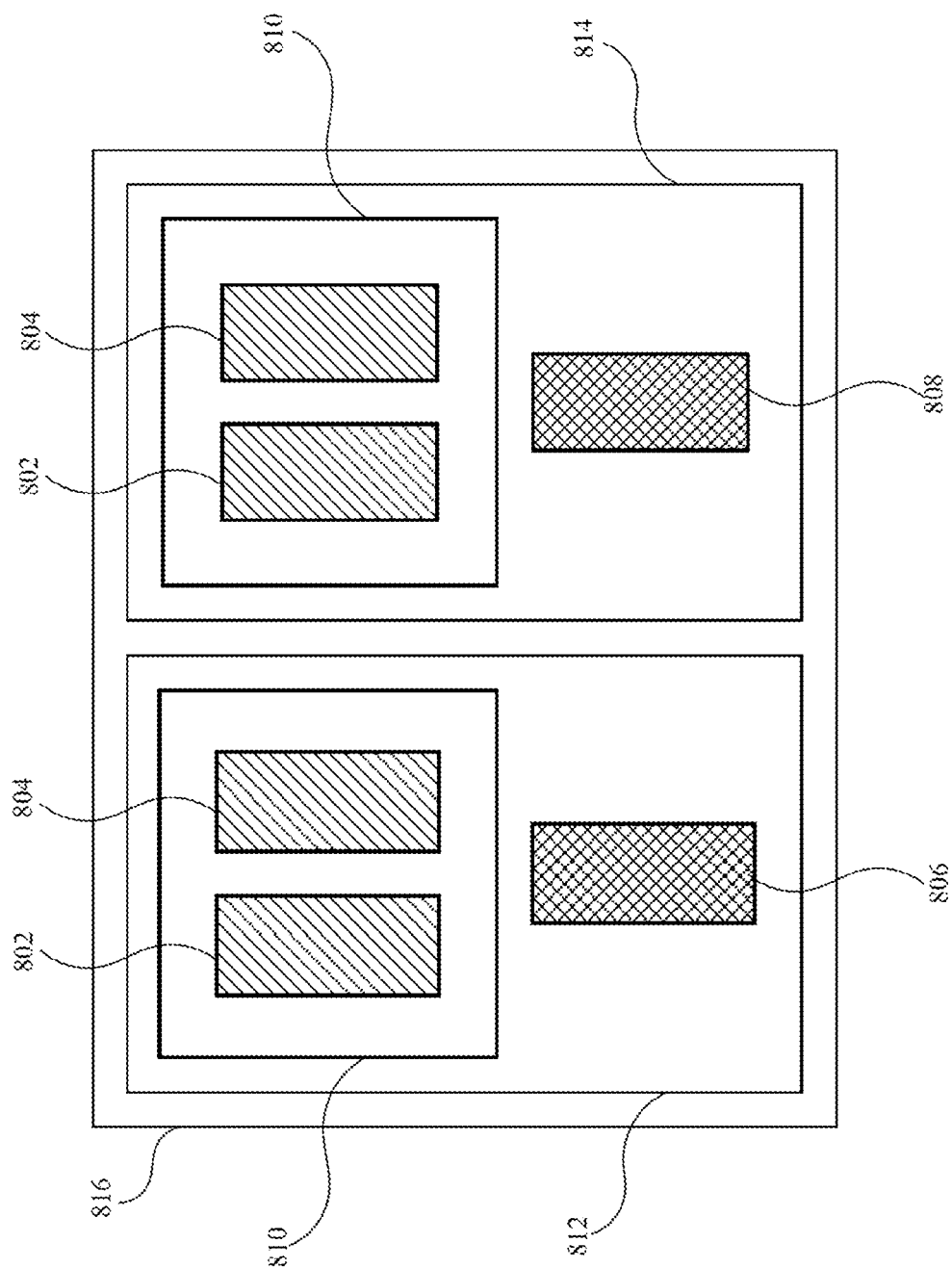
FIG. 8 is a diagram illustrating combinations of receptive fields corresponding to the steps performed by the modules of the multi-scale first and second dimensional receptive field information obtaining module in FIG. 7, and the module of the aggregated multi-scale first and second dimensional receptive field information obtaining module in FIG. 6 in accordance with an embodiment of the present disclosure.

FIG. 8 is a diagram illustrating combinations of receptive fields corresponding to the steps performed by the modules 702 and 704 of the multi-scale first and second dimensional receptive field information obtaining module 602 in FIG. 7, and the module 604 of the aggregated multi-scale first and second dimensional receptive field information obtaining module 600 in FIG. 6 in accordance with an embodiment of the present disclosure. In the examples in FIGS. 7 and 8, for the aggregated multi-scale first dimensional receptive field information obtaining module 702, the at least one second convolutional neural network operation is performed. The at least one second convolutional neural network operation exemplarily has at least one of multi-scale first dimensional receptive fields 802 and 804. The aggregated multi-scale first dimensional receptive field information 706 is obtained. That is, information from a combination 810 of the multi-scale first dimensional receptive fields 802 and 804 is aggregated.

For the multi-aggregated multi-first dimensional scale and single-second dimensional scale first and second dimensional receptive field information obtaining module 704, each of the third convolutional neural network operations is performed. The third convolutional neural network operations exemplarily has two operations correspondingly having multi-scale second dimensional receptive fields 806 and 808. Each of the third convolutional neural network operations is performed using the aggregated multi-scale first dimensional receptive field information 706 to obtain corresponding aggregated multi-first dimensional scale and single-second dimensional scale first and second dimensional receptive field information 708. That is, information from a corresponding combination 812 or 814 of all of the multi-scale first dimensional receptive fields 802 and 804 and each of the multi-scale second dimensional receptive fields 806 and 808 is aggregated. The corresponding aggregated multi-first dimensional scale and single-second dimensional scale first and second dimensional receptive field information 708 for all of the third convolutional neural network operations is the information 608 from the multi-scale first and second dimensional receptive fields. That is, the information 608 from the multi-scale first and second dimensional receptive fields is information from the combination 812 of all of the multi-scale first dimensional receptive fields 802 and 804 and one 806 of the multi-scale second dimensional receptive fields 806 and 808, and the combination 814 of all of the multi-scale first dimensional receptive fields 802 and 804 and another 808 of the multi-scale second dimensional receptive fields 806 and 808.

For the multi-scale first and second dimensional receptive field information aggregating module 604, the information 608 from the multi-scale first and second dimensional receptive fields is aggregated to obtain the aggregated multi-scale first and second dimensional receptive field information 610. That is, information from a combination 816 of the combination 812 of all of the multi-scale first dimensional receptive fields 802 and 804 and the one 806 of the multi-scale second dimensional receptive fields 806 and 808, and the combination 814 of all of the multi-scale first dimensional receptive fields 802 and 804 and the another 808 of the multi-scale second dimensional receptive fields 806 and 808 is aggregated.

Figure 9:
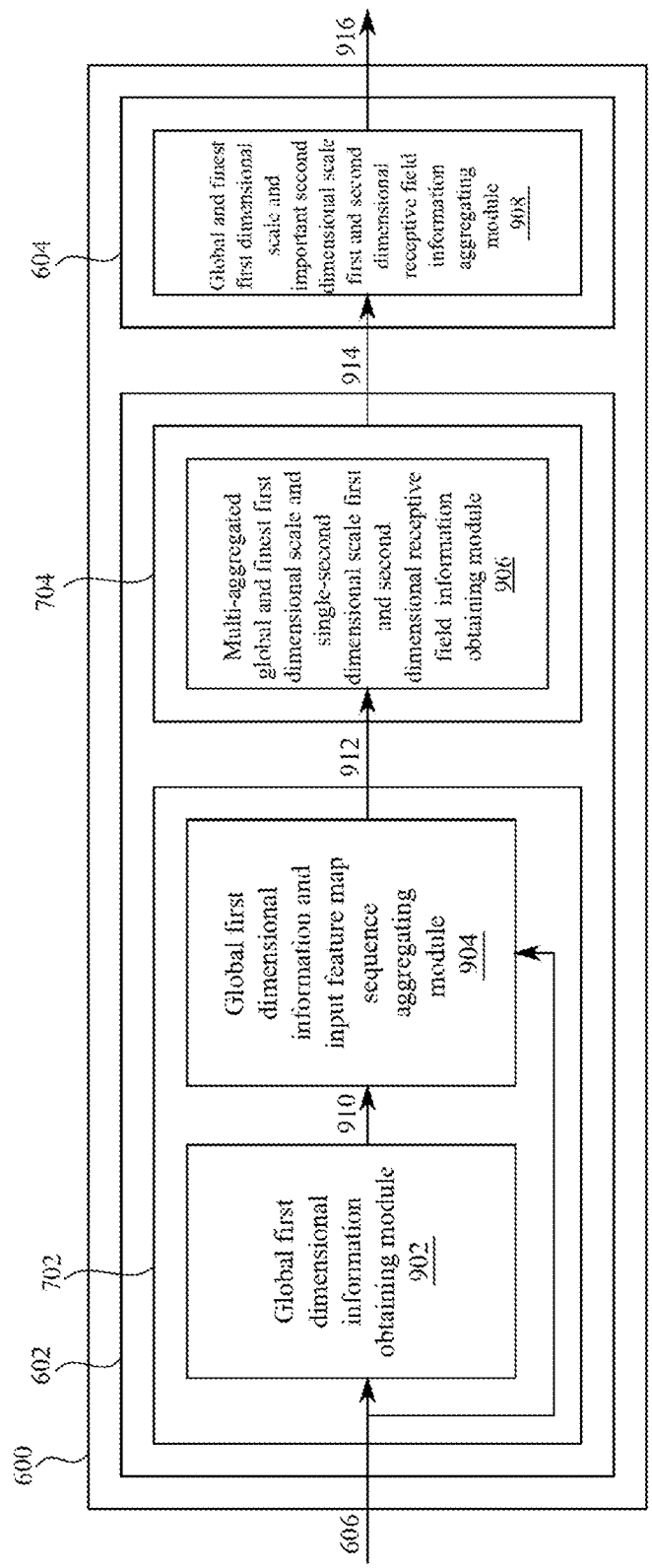
FIG. 9 is a block diagram illustrating the aggregated multi-scale first dimensional receptive field information obtaining module in FIG. 7 including modules in FIG. 9 and illustrating modules correspondingly in FIGS. 7 and 6 corresponding to the aggregated multi-scale first dimensional receptive field information obtaining module in FIG. 9 in accordance with an embodiment of the present disclosure.

FIG. 9 is a block diagram illustrating the aggregated multi-scale first dimensional receptive field information obtaining module 702 in FIG. 7 including modules 902 and 904 in FIG. 9 and illustrating modules 704 and 604 correspondingly in FIGS. 7 and 6 corresponding to the aggregated multi-scale first dimensional receptive field information obtaining module 702 in FIG. 9 in accordance with an embodiment of the present disclosure.

The aggregated multi-scale first dimensional receptive field information obtaining module 702 includes a global first dimensional information obtaining module 902 and a global first dimensional information and input feature map sequence aggregating module 904.

The global first dimensional information obtaining module 902 is configured to perform the at least one second convolutional neural network operation using the input feature map sequence 606 to obtain global first dimensional information 910. Referring also to FIG. 8, the at least one second convolutional neural network operation has only one operation having one 802 of the multi-scale first dimensional receptive fields 802 and 804. The one 802 of the multi-scale first dimensional receptive fields 802 and 804 has a global scale.

The global first dimensional information and input feature map sequence aggregating module 904 is configured to aggregate the global first dimensional information 910 and the input feature map sequence 606 to obtain the aggregated global and finest scale first dimensional receptive field information 912. In an embodiment, aggregation performed by the global first dimensional information and input feature map sequence aggregating module 904 is an element-wise summation operation. Referring also to FIG. 8, the input feature map sequence 606 is obtained by an operation having another 804 of the multi-scale first dimensional receptive fields 802 and 804. Because the another 804 of the multi-scale first dimensional receptive fields 802 and 804 is directly a scale of a first dimensional respective field of an operation that obtains the input feature map sequence 606, not a scale of a first dimensional respective field of one of the at least one second convolutional neural network operation that takes the input feature map sequence 606 as an input, the another 804 of the multi-scale first dimensional receptive fields 802 and 804 has the finest scale. By aggregating the global first dimensional information 910 and the input feature map sequence 606, information from the combination 810 of the multi-scale first dimensional receptive fields 802 and 804 is aggregated.

Referring to FIG. 9, correspondingly, the multi-aggregated multi-first dimensional scale and single-second dimensional scale first and second dimensional receptive field information obtaining module 704 includes a multi-aggregated global and finest first dimensional scale and single-second dimensional scale first and second dimensional receptive field information obtaining module 906. The multi-aggregated global and finest first dimensional scale and single-second dimensional scale first and second dimensional receptive field information obtaining module 906 is configured to perform each of the third convolutional neural network operations using the aggregated global and finest scale first dimensional receptive field information 912 to obtain corresponding aggregated global and finest first dimensional scale and single-second dimensional scale first and second dimensional receptive field information 914. The corresponding aggregated global and finest first dimensional scale and single-second dimensional scale first and second dimensional receptive field information 914 for all of the third convolutional neural network operations is the information 608 from the multi-scale first and second dimensional receptive fields.

Correspondingly, the multi-scale first and second dimensional receptive field information aggregating module 604 includes a global and finest first dimensional scale and important second dimensional scale first and second dimensional receptive field information aggregating module 908. The global and finest first dimensional scale and important second dimensional scale first and second dimensional receptive field information aggregating module 908 is configured to aggregate the information 608 from the multi-scale first and second dimensional receptive fields to obtain the global and finest first dimensional scale and important second dimensional scale first and second dimensional receptive field information 916.

Corresponding combinations of receptive fields in FIG. 8 corresponding to the corresponding steps performed by the multi-aggregated multi-first dimensional scale and single-second dimensional scale first and second dimensional receptive field information obtaining module 704 in FIG. 7 and the multi-scale first and second dimensional receptive field information aggregating module 604 in FIG. 6 described above apply mutatis mutandis to this embodiment.

Figure 10:
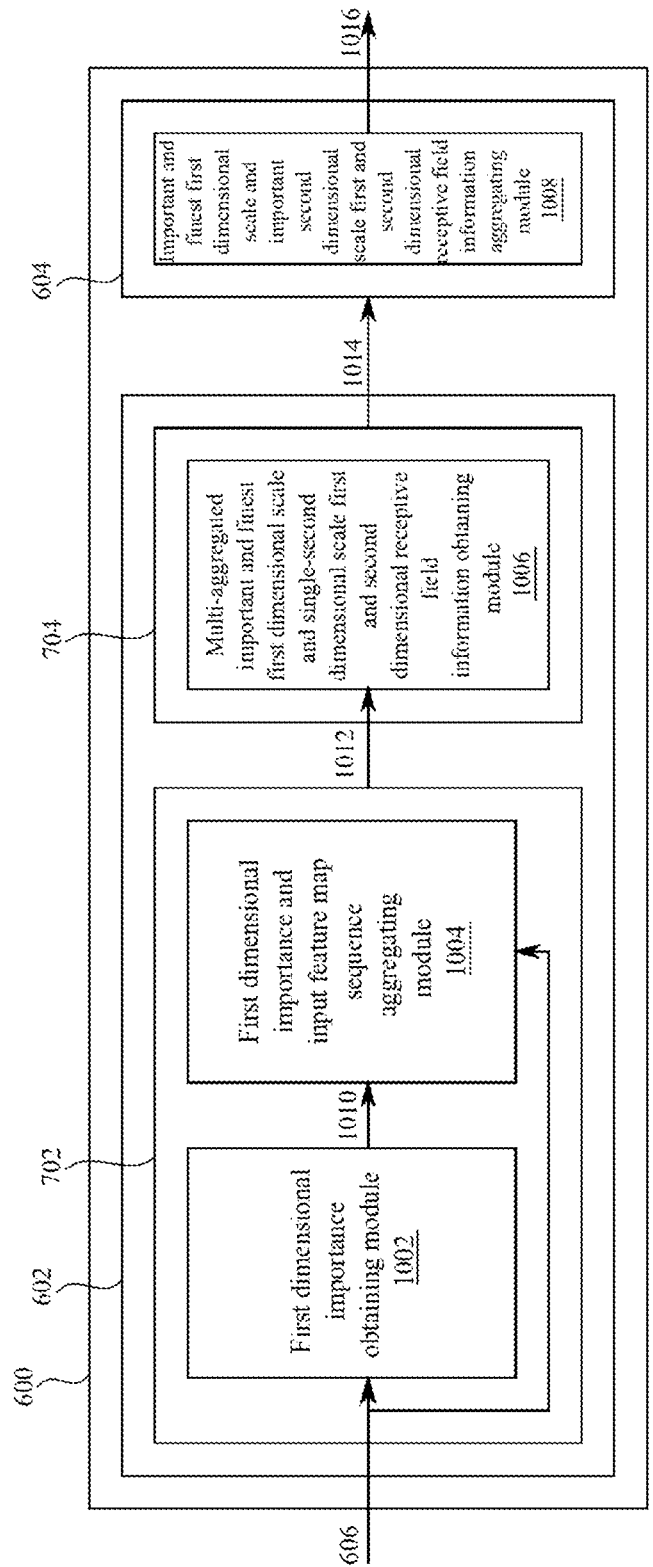
FIG. 10 is a block diagram illustrating the aggregated multi-scale first dimensional receptive field information obtaining module in FIG. 7 including modules in FIG. 10 and illustrating modules correspondingly in FIGS. 7 and 6 corresponding to the aggregated multi-scale first dimensional receptive field information obtaining module in FIG. 10 in accordance with an embodiment of the present disclosure.

FIG. 10 is a block diagram illustrating the aggregated multi-scale first dimensional receptive field information obtaining module 702 in FIG. 7 including modules 1002 and 1004 in FIG. 10 and illustrating modules 704 and 604 correspondingly in FIGS. 7 and 6 corresponding to the aggregated multi-scale first dimensional receptive field information obtaining module 702 in FIG. 10 in accordance with an embodiment of the present disclosure.

The aggregated multi-scale first dimensional receptive field information obtaining module 702 includes a first dimensional importance obtaining module 1002 and a first dimensional importance and input feature map sequence aggregating module 1004.

The first dimensional importance obtaining module 1002 is configured to perform the at least one second convolutional neural network operation using the input feature map sequence 606 to obtain first dimensional importance 1010. Referring also to FIG. 8, the at least one second convolutional neural network operation exemplarily has two operations correspondingly having one 802 of the multi-scale first dimensional receptive fields 802, 804, and 818 (not shown), and another 804 of the multi-scale first dimensional receptive fields 802, 804, and 818 (not shown). The one 802 of the multi-scale first dimensional receptive fields 802, 804, and 818 (not shown) has a global scale. The another 804 of the multi-scale first dimensional receptive fields 802, 804, and 818 (not shown) has a finer scale than the global scale. Other number of the second convolutional neural network operations having corresponding first dimensional receptive fields having different corresponding scales are within the contemplated scope of the present disclosure.

The first dimensional importance and input feature map sequence aggregating module 1004 is configured to aggregate the first dimensional importance 1010 and the input feature map sequence 606 to obtain the aggregated important and finest scale first dimensional receptive field information 1012. In an embodiment, aggregation performed by the first dimensional importance and input feature map sequence aggregating module 1004 is an element-wise summation operation. The first dimensional importance 1010 is added to the input feature map sequence 606 as residual information. Referring also to FIG. 8, the input feature map sequence 606 is obtained by an operation having still another 818 (not shown) of multi-scale first dimensional receptive fields 802, 804, and 818 (not shown). Because the still another 818 (not shown) of multi-scale first dimensional receptive fields 802, 804, and 818 (not shown) is directly a scale of a first dimensional respective field of an operation that obtains the input feature map sequence 606, not a scale of a first dimensional respective field of one of the at least one second convolutional neural network operation that takes the input feature map sequence 606 as an input, the still another 818 (not shown) of multi-scale first dimensional receptive fields 802, 804, and 818 (not shown) has the finest scale. By aggregating the first dimensional importance 1010 and the input feature map sequence 606, information from the combination 810 of the multi-scale first dimensional receptive fields 802, 804, and 818 (not shown) is aggregated.

Referring to FIG. 10, correspondingly, the multi-aggregated multi-first dimensional scale and single-second dimensional scale first and second dimensional receptive field information obtaining module 704 includes a multi-aggregated important and finest first dimensional scale and single-second dimensional scale first and second dimensional receptive field information obtaining module 1006. The multi-aggregated important and finest first dimensional scale and single-second dimensional scale first and second dimensional receptive field information obtaining module 1006 is configured to perform each of the third convolutional neural network operations using the aggregated important and finest scale first dimensional receptive field information 1012 to obtain corresponding aggregated important and finest first dimensional scale and single-second dimensional scale first and second dimensional receptive field information 1014. The corresponding aggregated important and finest first dimensional scale and single-second dimensional scale first and second dimensional receptive field information 1014 for all of the third convolutional neural network operations is the information 608 from the multi-scale first and second dimensional receptive fields.

Correspondingly, the multi-scale first and second dimensional receptive field information aggregating module 604 includes an important and finest first dimensional scale and important second dimensional scale first and second dimensional receptive field information aggregating module 1008. The important and finest first dimensional scale and important second dimensional scale first and second dimensional receptive field information aggregating module 1008 is configured to aggregate the information 608 from the multi-scale first and second dimensional receptive fields to obtain the important and finest first dimensional scale and important second dimensional scale first and second dimensional receptive field information 1016. Important first dimensional scale and important second dimensional scale first and second dimensional receptive field information is also referred to as first and second dimensional importance here.

Corresponding combinations of receptive fields in FIG. 8 corresponding to the corresponding steps performed by the multi-aggregated multi-first dimensional scale and single-second dimensional scale first and second dimensional receptive field information obtaining module 704 in FIG. 7 and the multi-scale first and second dimensional receptive field information aggregating module 604 in FIG. 6 described above apply mutatis mutandis to this embodiment.

The first dimensional importance and input feature map sequence aggregating module 1004 is optional. Alternatively, the aggregated multi-scale first dimensional receptive field information obtaining module 702 only includes the first dimensional importance obtaining module 1002.

Figure 11:
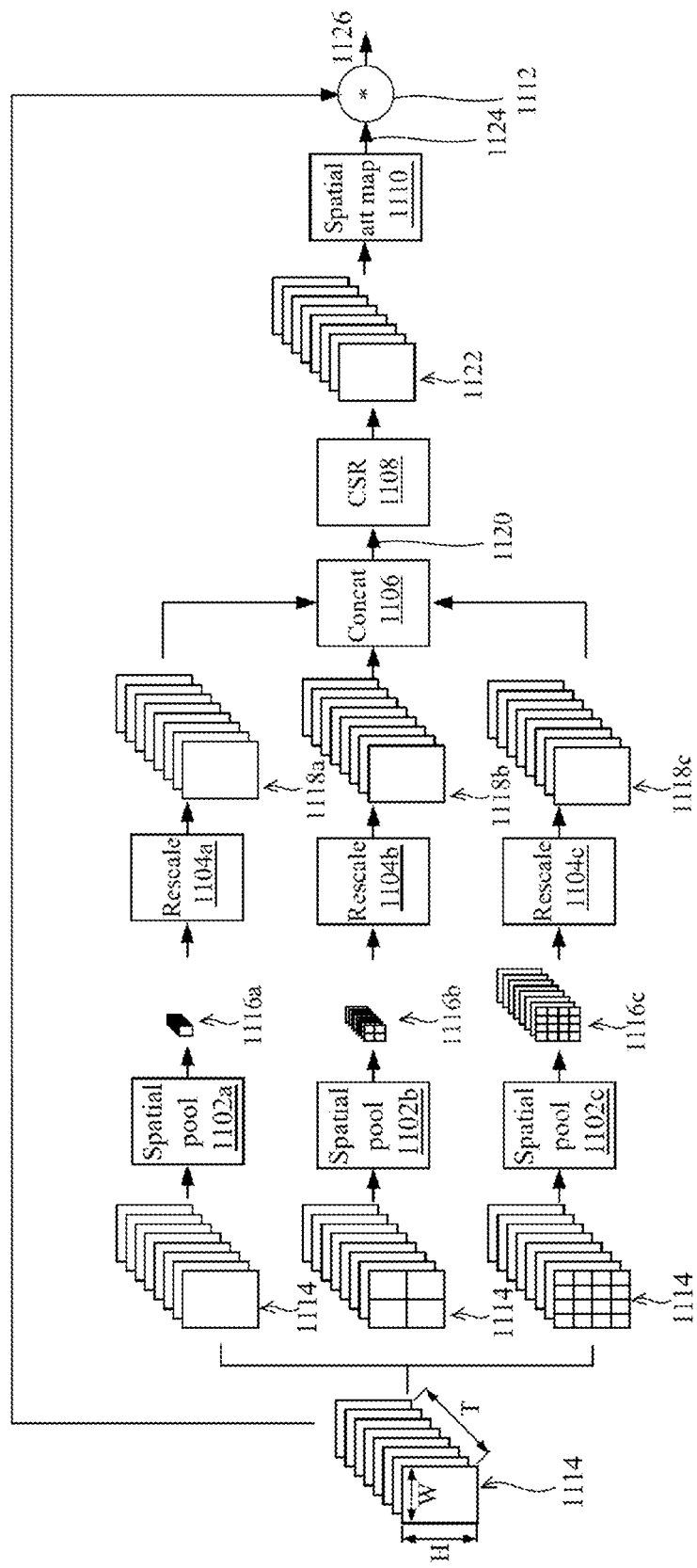
FIG. 11 is a schematic diagram illustrating details of the first dimensional importance obtaining module in FIG. 10 in accordance with an embodiment of the present disclosure.

FIG. 11 is a schematic diagram illustrating details of the first dimensional importance obtaining module 1002 in FIG. 10 in accordance with an embodiment of the present disclosure. The first dimensional importance obtaining module 1002 is configured to perform the at least one second convolutional neural network operation using the input feature map sequence 606 to obtain first dimensional importance 1010. In an embodiment, the input feature map sequence 606 is an input feature map sequence 1114. The input feature map sequence 1114 has a size of T×H×W, where T, H, and W denotes the time, height, and width dimensions, respectively. The at least one second convolutional neural network operation is a spatial pooling operation set 1102. The spatial pooling operation set 1102 includes a plurality of spatial pooling operations 1102*a*, 1102*b*, and 1102*c*. The spatial pooling operations 1102*a*, 1102*b*, and 1102*c* have different scales to capture spatial information at different resolutions. The spatial pooling operation 1102*a* uses a pooling window size of H×W to spatially pool the input feature map sequence 1114 into an output feature map sequence 1116a of the spatial pooling operation 1102a, wherein the output feature map sequence 1116a of the spatial pooling operation 1102a has a size of T×1×1. The spatial pooling operation 1102b uses a pooling window size of (H/2)×(W/2) to spatially pool the input feature map sequence 1114 into an output feature map sequence 1116b of the spatial pooling operation 1102b, wherein the output feature map sequence 1116b of the spatial pooling operation 1102b has a size of T×2×2. The spatial pooling operation 1102c uses a pooling window size of (H/4)×(W/4) to spatially pool the input feature map sequence 1114 into an output feature map sequence 1116c of the spatial pooling operation 1102c, wherein the output feature map sequence 1116c of the spatial pooling operation 1102c has a size of T×4×4. Each spatial pooling operation 1102a, 1102b, or 1102c is more preferred to be a max pooling operation because the first dimensional importance obtaining module 1002 is trying to capture the highest response to determine which region is more important for video classification. Alternatively, each spatial pooling operation 1102a, 1102b, or 1102c may be an average pooling operation.

Compared to the above embodiment where the at least one second convolutional neural network operation is the spatial pooling operation set 1102, an alternative embodiment where the at least one second convolutional neural network operation is a spatial dilated convolution operation set including a plurality of spatial dilated convolution operations is as follows. The above embodiment achieves the multi-scale spatial receptive fields through corresponding different window sizes of the spatial pooling operations. The alternative embodiment achieves the multi-scale spatial receptive fields through corresponding different dilation rates of the spatial dilated convolution operations.

After performing the spatial pooling operation set 1102, the first dimensional importance obtaining module 1002 further performs a rescaling operation set 1104, a concatenating operation 1106, and then a channel size reducing (CSR) operation 1108 to aggregate the output feature map sequences 1116 of the spatial pooling operation set 1102. Each output feature map sequence 1116a, 1116b, or 1116c of the corresponding spatial pooling operation 1102a, 1102b, or 1102c is spatially subsampled. The rescaling operation set 1104 includes a plurality of rescaling operations 1104a, 1104b, and 1104c. Each rescaling operations 1104a, 1104b, or 1104c rescales the corresponding output feature map sequence 1116a, 1116b, or 1116c of the corresponding spatial pooling operation 1102a, 1102b, or 1102c back to a corresponding output feature map sequence 1118a, 1118b, or 1118c of each rescaling operations 1104a, 1104b, or 1104c. Each output feature map sequence 1118a, 1118b, or 1118c of the corresponding rescaling operation 1104a, 1104b, or 1104c has a size of T×H×W. Each rescaling operation 1104a, 1104b, or 1104c may be an interpolation operation such as a bilinear interpolation operation. Alternatively, each rescaling operation 1104a, 1104b, or 1104c may be a deconvolution operation. The concatenating operation 1106 concatenates the corresponding output feature map sequences 1118a, 1118b, and 1118c of the rescaling operation set 1104 along a channel axis, resulting in an output feature map sequence 1120 of the concatenating operation 1106 having a size of T×H×W×3. The CSR operation 1108 is applied to the output feature map sequence 1120 of the concatenating operation 1106 to obtain an output feature map sequence 1122 of the CSR operation 1108 having a size of T×H×W×1. The CSR operation 1208 may be a 1×1×1 convolution operation. Alternatively, the CSR operation 1208 may be an element-wise summation operation. For the alternative embodiment where the at least one second convolutional neural network operation is the spatial dilated convolution operation set, the rescaling operation set 1104 may not be needed.

After performing the CSR operation 1108, the first dimensional importance obtaining module 1002 further performs a spatial attention map sequence obtaining operation 1110 using the output feature map sequence 1122 of the CSR operation 1108 to obtain a spatial attention map sequence 1124. The spatial attention map sequence obtaining operation 1110 may be a softmax function. Alternatively, the spatial attention map sequence obtaining operation 1110 may be a sigmoid function. Then, the first dimensional importance obtaining module 1002 further performs an element-wise multiplication operation 1112 on the input feature map sequence 1114 and the spatial attention map sequence 1124 to obtain spatial importance 1126. In this embodiment, the first dimensional importance 1010 is the spatial importance 1126.

Compared to the above embodiment where the spatial attention map sequence obtaining operation 1110 is performed to obtain the spatial importance 1126, an alternative embodiment where the spatial importance 1126 is obtained without the spatial attention map sequence obtaining operation 1110 is as follows. The output feature map sequence 1122 of the CSR operation 1108 directly serves as the spatial importance 1126.

Figure 12:
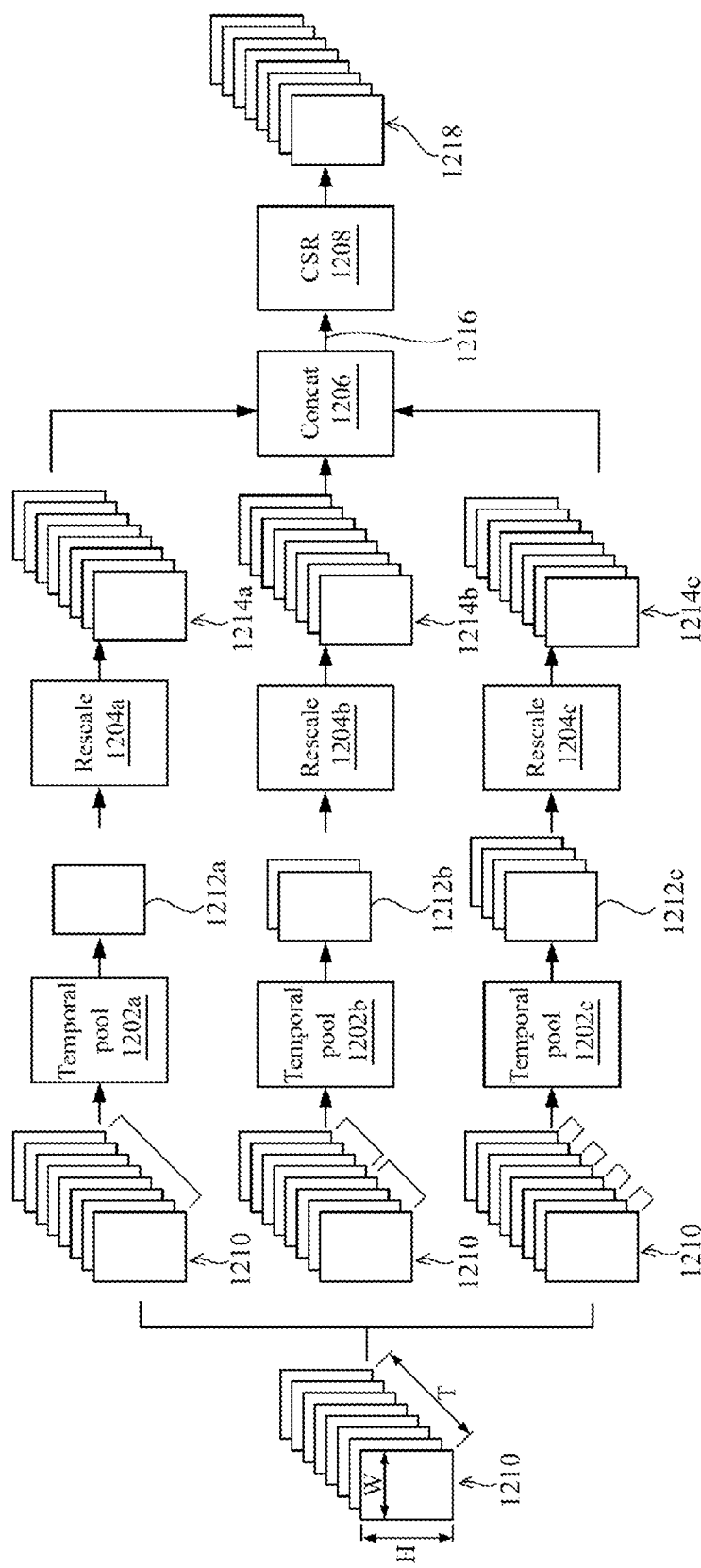
FIG. 12 is a block diagram illustrating details of the multi-aggregated important and finest first dimensional scale and single-second dimensional scale first and second dimensional receptive field information obtaining module and the important and finest first dimensional scale and important second dimensional scale first and second dimensional receptive field information aggregating module in FIG. 10 in accordance with an embodiment of the present disclosure.

FIG. 12 is a block diagram illustrating details of the multi-aggregated important and finest first dimensional scale and single-second dimensional scale first and second dimensional receptive field information obtaining module 1006 and the important and finest first dimensional scale and important second dimensional scale first and second dimensional receptive field information aggregating module 1008 in FIG. 10 in accordance with an embodiment of the present disclosure.

The multi-aggregated important and finest first dimensional scale and single-second dimensional scale first and second dimensional receptive field information obtaining module 1006 is configured to perform each of the third convolutional neural network operations using the aggregated important and finest scale first dimensional receptive field information 1012 to obtain corresponding aggregated important and finest first dimensional scale and single-second dimensional scale first and second dimensional receptive field information 1014. In an embodiment, the aggregated important and finest scale first dimensional receptive field information 1012 is an aggregated important and finest scale spatial receptive field information 1210. The aggregated important and finest scale spatial receptive field information 1210 has a size of T×H×W, where T, H, and W denotes the time, height, and width dimensions, respectively. The third convolutional neural network operations are a temporal pooling operation set 1202. The temporal pooling operation set 1202 includes a plurality of temporal pooling operations 1202a, 1202b, and 1202c. The temporal pooling operations 1202a, 1202b, and 1202c have different scales to capture temporal information at different resolutions. The temporal pooling operation 1202a uses a pooling window size of T to temporally pool the aggregated important and finest scale spatial receptive field information 1210 into an output feature map set 1212a of the temporal pooling operation 1202a, wherein the output feature map set 1212a of the temporal pooling operation 1202a has a size of 1×H×W. The temporal pooling operation 1202b uses a pooling window size of T/2 to temporally pool the aggregated important and finest scale spatial receptive field information 1210 into an output feature map set 1212b of the temporal pooling operation 1202b, wherein the output feature map set 1212b of the temporal pooling operation 1202b has a size of 2×H×W. The temporal pooling operation 1202c uses a pooling window size of T/4 to temporally pool the aggregated important and finest scale spatial receptive field information 1210 into an output feature map set 1212c of the temporal pooling operation 1202c, wherein the output feature map set 1212c of the temporal pooling operation 1202c has a size of 4×H×W. Each temporal pooling operation 1202a, 1202b, or 1202c is an average pooling operation. Alternatively, each temporal pooling operation 1202a, 1202b, or 1202c may be a max pooling operation. In this embodiment, the corresponding aggregated important and finest first dimensional scale and single-second dimensional scale first and second dimensional receptive field information 1014 is each of the output feature map set 1212a of the temporal pooling operation 1202a, the output feature map set 1212b of the temporal pooling operation 1202b, and the output feature map set 1212c of the temporal pooling operation 1202c.

Compared to the above embodiment where the third convolutional neural network operations is the temporal pooling operation set 1202, an alternative embodiment where the third convolutional neural network operations is a temporal dilated convolution operation set including a plurality of temporal dilated convolution operations is as follows. The above embodiment achieves the multi-scale temporal receptive fields through corresponding different window sizes of the temporal pooling operations. The alternative embodiment achieves the multi-scale temporal receptive fields through corresponding different dilation rates of the temporal dilated convolution operations.

The important and finest first dimensional scale and important second dimensional scale first and second dimensional receptive field information aggregating module 1008 is configured to aggregate the information 608 from the multi-scale first and second dimensional receptive fields to obtain the important and finest first dimensional scale and important second dimensional scale first and second dimensional receptive field information 1016. In this embodiment, the information 608 from the multi-scale first and second dimensional receptive fields is the output feature map set 1212a of the temporal pooling operation 1202a, the output feature map set 1212b of the temporal pooling operation 1202b, and the output feature map set 1212c of the temporal pooling operation 1202c. The important and finest first dimensional scale and important second dimensional scale first and second dimensional receptive field information aggregating module 1008 performs a rescaling operation set 1204, a concatenating operation 1206, and then a CSR operation 1208 to aggregate the output feature map sets 1212 of the temporal pooling operation set 1202. Each output feature map set 1212a, 1212b, or 1212c of the corresponding temporal pooling operation 1202a, 1202b, or 1202c is temporally subsampled. The rescaling operation set 1204 includes a plurality of rescaling operations 1204a, 1204b, and 1204c. Each rescaling operations 1204a, 1204b, or 1204c rescales the corresponding output feature map set 1212a, 1212b, or 1212c of the corresponding temporal pooling operation 1202a, 1202b, or 1202c back to a corresponding output feature map sequence 1210a, 1210b, or 1210c of each rescaling operations 1204a, 1204b, or 1204c. Each output feature map sequence 1210a, 1210b, or 1210c of the corresponding rescaling operation 1204a, 1204b, or 1204c has a size of T×H×W. Each rescaling operation 1204a, 1204b, or 1204c may be an interpolation operation such as a bilinear interpolation operation. Alternatively, each rescaling operation 1204a, 1204b, or 1204c may be a deconvolution operation. The concatenating operation 1206 concatenates the corresponding output feature map sequences 1210a, 1210b, and 1210c of the rescaling operation set 1204 along a channel axis, resulting in an output feature map sequence 1216 of the concatenating operation 1206 having a size of T×H×W×3. The CSR operation 1208 is applied to the output feature map sequence 1216 of the concatenating operation 1206 to obtain important and finest spatial scale and important temporal scale spatiotemporal receptive field information 1218 having a size of T×H×W×1. The CSR operation 1208 may be a 1×1×1 convolution operation. Alternatively, the CSR operation 1208 may be an element-wise summation operation. In this embodiment, the important and finest first dimensional scale and important second dimensional scale first and second dimensional receptive field information 1016 is the important and finest spatial scale and important temporal scale spatiotemporal receptive field information 1218. For the alternative embodiment where the third convolutional neural network operations are the temporal dilated convolution operation set, the rescaling operation set 1204 may not be needed.

Compared to the above embodiment where an output feature map sequence of the CSR operation 1208 directly serves as the important and finest spatial scale and important temporal scale spatiotemporal receptive field information 1218, an alternative embodiment where the important and finest spatial scale and important temporal scale spatiotemporal receptive field information 1218 is obtained with a temporal attention map sequence obtaining operation is as follows. The important and finest first dimensional scale and important second dimensional scale first and second dimensional receptive field information aggregating module 1008 further performs the temporal attention map sequence obtaining operation using the output feature map sequence of the CSR operation 1208 to obtain a temporal attention map sequence. The temporal attention map sequence obtaining operation may be a softmax function. Alternatively, the temporal attention map sequence obtaining operation may be a sigmoid function. Then, the important and finest first dimensional scale and important second dimensional scale first and second dimensional receptive field information aggregating module 1008 further performs an element-wise multiplication operation on the aggregated important and finest scale spatial receptive field information 1210 and the temporal attention map sequence to obtain the important and finest spatial scale and important temporal scale spatiotemporal receptive field information 1218.

As used here, the term "attention map sequence mechanism" refers to one or both of the spatial attention map sequence obtaining operation 1110 in FIG. 11 and the temporal attention map sequence obtaining operation are used.

Compared to the above embodiments described with reference to FIGS. 11 and 12 where being first dimensional is being spatial and being second dimensional is being temporal, an alternative embodiment where being first dimensional is being temporal and being second dimensional is being spatial is as follows. Details of the first dimensional importance obtaining module 1002 in FIG. 10 mutatis mutandis become those described with reference to FIG. 12. Details of the multi-aggregated important and finest first dimensional scale and single-second dimensional scale first and second dimensional receptive field information obtaining module 1006 and the important and finest first dimensional scale and important second dimensional scale first and second dimensional receptive field information aggregating module 1008 in FIG. 10 mutatis mutandis become those described with reference to FIG. 11.

Figure 13:
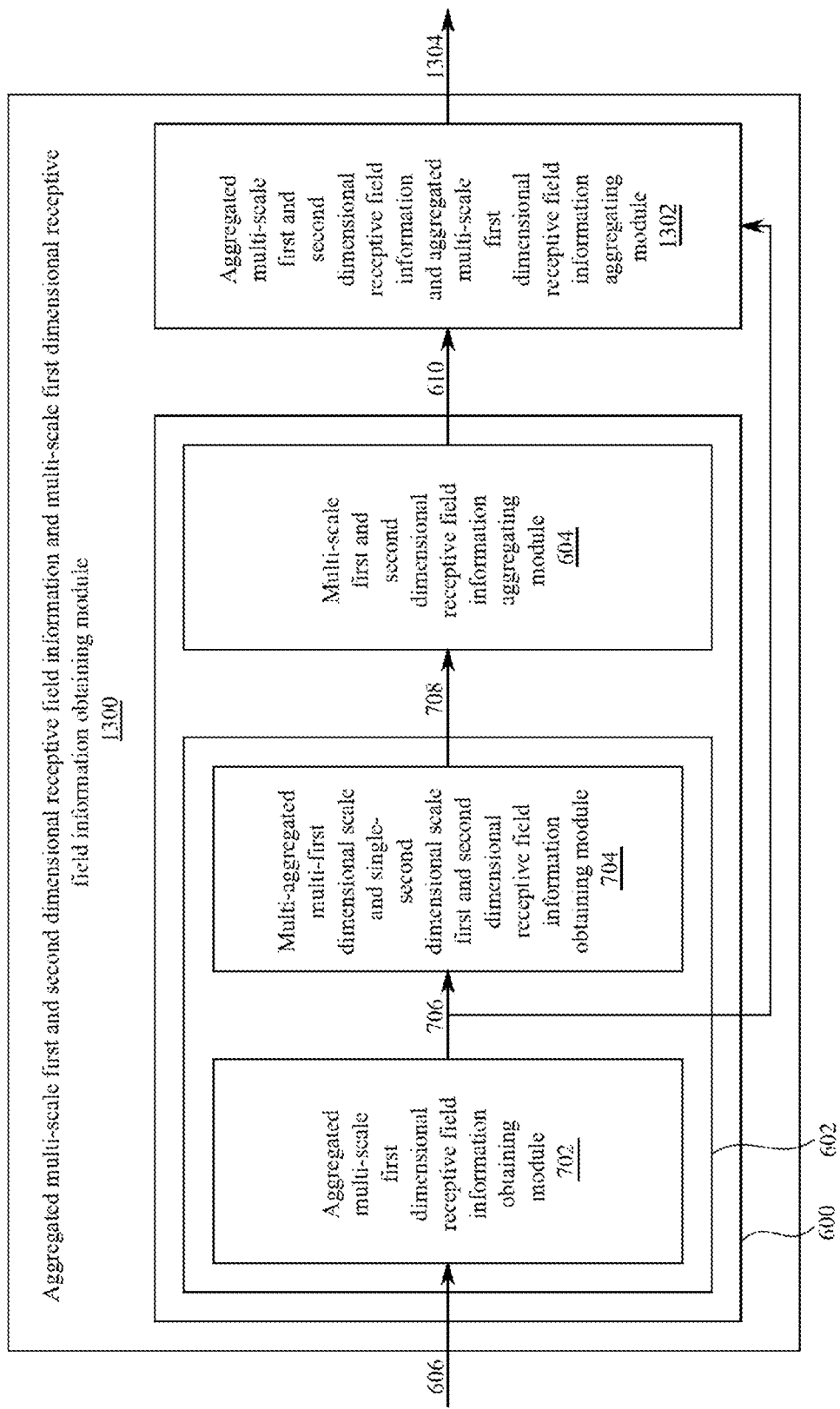
FIG. 13 is a block diagram illustrating an aggregated multi-scale first and second dimensional receptive field information and multi-scale first dimensional receptive field information obtaining module in accordance with an embodiment of the present disclosure.

FIG. 13 is a block diagram illustrating an aggregated multi-scale first and second dimensional receptive field information and multi-scale first dimensional receptive field information obtaining module 1300 in accordance with an embodiment of the present disclosure. The aggregated multi-scale first and second dimensional receptive field information and multi-scale first dimensional receptive field information obtaining module 1300 is configured to obtain aggregated multi-scale first and second dimensional receptive field information and multi-scale first dimensional receptive field information 1304 using the input feature map sequence 606. The aggregated multi-scale first and second dimensional receptive field information and multi-scale first dimensional receptive field information obtaining module 1300 includes the aggregated multi-scale first and second dimensional receptive field information obtaining module 600 in FIG. 6. In FIG. 13, the multi-scale first and second dimensional receptive field information obtaining module 602 in the aggregated multi-scale first and second dimensional receptive field information obtaining module 600 includes the aggregated multi-scale first dimensional receptive field information obtaining module 702 and the multi-aggregated multi-first dimensional scale and single-second dimensional scale first and second dimensional receptive field information obtaining module 704 in FIG. 7. The aggregated multi-scale first and second dimensional receptive field information and multi-scale first dimensional receptive field information obtaining module 1300 further includes an aggregated multi-scale first and second dimensional receptive field information and aggregated multi-scale first dimensional receptive field information aggregating module 1302. The aggregated multi-scale first and second dimensional receptive field information and aggregated multi-scale first dimensional receptive field information aggregating module 1302 is configured to aggregate the aggregated multi-scale first and second dimensional receptive field information 610 and the aggregated multi-scale first dimensional receptive field information 706 into the aggregated multi-scale first and second dimensional receptive field information and multi-scale first dimensional receptive field information 1304. In an embodiment, aggregation performed by the aggregated multi-scale first and second dimensional receptive field information and aggregated multi-scale first dimensional receptive field information aggregating module 1302 is an element-wise summation operation. In some of the embodiments described above, the aggregated multi-scale first and second dimensional receptive field information 610 includes the first and second dimensional importance. The aggregated multi-scale first dimensional receptive field information 706 includes the first dimensional importance 1010 and the input feature map sequence 606. By aggregating the aggregated multi-scale first and second dimensional receptive field information 610 and the aggregated multi-scale first dimensional receptive field information 706, the first and second dimensional importance and the first dimensional importance 1010 are added to the input feature map sequence 606 as residual information.

As discussed above, the related art has the disadvantage of not being able to consider many irrelevant or trivial information in each frame of the video clip as irrelevant or trivial. In the following, effects of the embodiments described with reference to FIGS. 9 to 12 are illustrated using examples in FIGS. 14 to 17. In these examples, being first dimensional is being spatial and being second dimensional is being temporal.

Referring to FIG. 13, suppose an aggregated temporal importance and input feature map sequence obtaining module is similar to the aggregated multi-scale first and second dimensional receptive field information and multi-scale first dimensional receptive field information obtaining module 1300 in FIG. 13, and is different from the aggregated multi-scale first and second dimensional receptive field information and multi-scale first dimensional receptive field information obtaining module 1300 in that the aggregated temporal importance and input feature map sequence obtaining module does not include the aggregated multi-scale first dimensional receptive field information obtaining module 702. In other words, the multi-aggregated multi-first dimensional scale and single-second dimensional scale first and second dimensional receptive field information obtaining module 704 and the aggregated multi-scale first and second dimensional receptive field information and aggregated multi-scale first dimensional receptive field information aggregating module 1302 directly and mutatis mutandis uses the input feature map sequence 606 instead of the aggregated multi-scale first dimensional receptive field information 706. The aggregated temporal importance and input feature map sequence obtaining module is configured to obtain aggregated temporal importance and input feature map sequence using the input feature map sequence 606.

Figure 14:
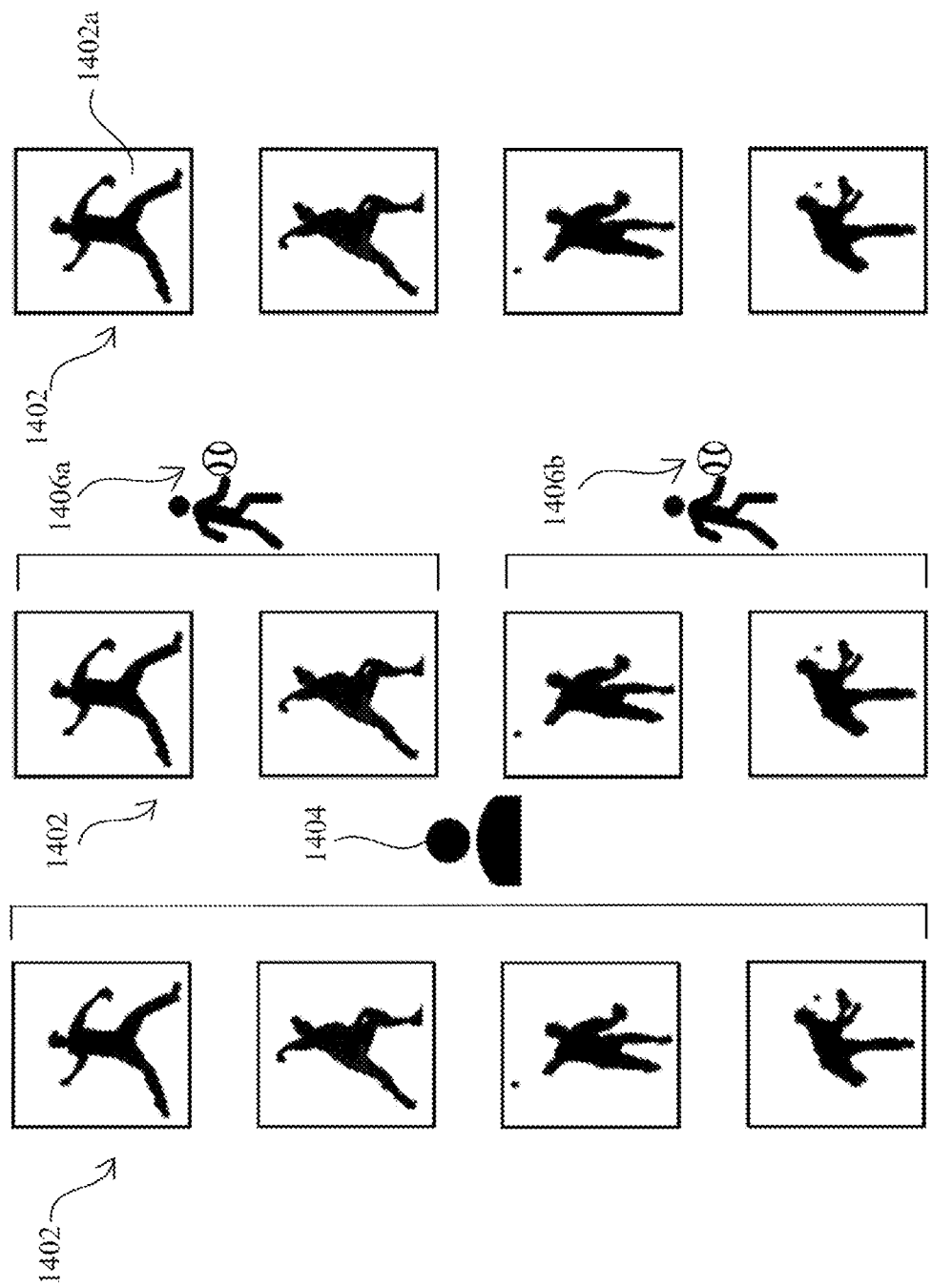
FIG. 14 is a schematic diagram illustrating context with at least one more suitable temporal scale obtained by the aggregated temporal importance and input feature map sequence obtaining module in accordance with an embodiment of the present disclosure.

FIG. 14 is a schematic diagram illustrating context with at least one more suitable temporal scale obtained by the aggregated temporal importance and input feature map sequence obtaining module in accordance with an embodiment of the present disclosure. FIG. 14 is a simplified example for illustrating the context with the at least one more suitable temporal scale. In this example, the temporal pooling operation 1202*a* and 1202*b* are illustrated, and the temporal pooling operation 1202*c* is not illustrated for simplicity. The input feature map sequence 606 is represented by an input feature map sequence 1402 in which a video clip having a player pitching a baseball is reflected. By performing the temporal pooling operation 1202*a* having the pooling window size of T on the input feature map sequence 1402, an output feature map 1404 of the temporal pooling operation 1202*a* reflects a profile of movements of the entire input feature map sequence 1402 which is context with a first temporal scale which is the most coarse. By performing the temporal pooling operation 1202*b* having the pooling window size of T/2 on the input feature map sequence 1402, each output feature map 1406*a* or 1406*b* of the output feature map set 1406 of the temporal pooling operation 1202*b* reflects a profile of movements of a corresponding half of the input feature map sequence 1402 which is context with a second temporal scale which is less coarse than the first temporal scale.

When the computer vision CNN makes a decision for classifying the video clip having the player pitching the baseball using the aggregated temporal importance and input feature map sequence, the computer vision CNN may learn the following from the aggregated temporal importance and input feature map sequence. The aggregated temporal importance and input feature map sequence has the following aggregated portions: the input feature map 1402*a*, the output feature map 1406*a* of the temporal pooling operation 1202*b*, and the output feature map 1404 of the temporal pooling operation 1202*a*. From the input feature map 1402*a*, the computer vision CNN may learn that there is a throwing action, but may not be able to learn whether a ball or a frisbee is thrown. From the output feature map 1406*a* of the temporal pooling operation 1202*b*, the computer vision CNN may learn that there are a human and a ball that are moving. From the output feature map 1404 of the temporal pooling operation 1202*a*, the computer vision CNN may learn that there is a human moving. In this case, the output feature map 1406*a* of the temporal pooling operation 1202*b* may be the context with the at least one more suitable temporal scale to be considered together with the input feature map 1402*a* at the same time for the computer vision CNN to learn that the human is throwing the ball. The output feature map 1404 of the temporal pooling operation 1202*a* may be too coarse to be helpful for recognizing a baseball pitching action. By considering the context with the at least one more suitable temporal scale together with the input feature map 1402*a* at the same time, less information in the aggregated temporal importance and input feature map sequence is needed for recognizing the baseball pitching action in the video clip, and the remaining information in the aggregated temporal importance and input feature map sequence that is not needed for recognizing the baseball pitching action is considered as irrelevant or trivial.

The aggregated multi-scale first dimensional receptive field information obtaining module 702 added in the aggregated multi-scale first and second dimensional receptive field information and multi-scale first dimensional receptive field information obtaining module 1300 has the following effects.

Figure 15:
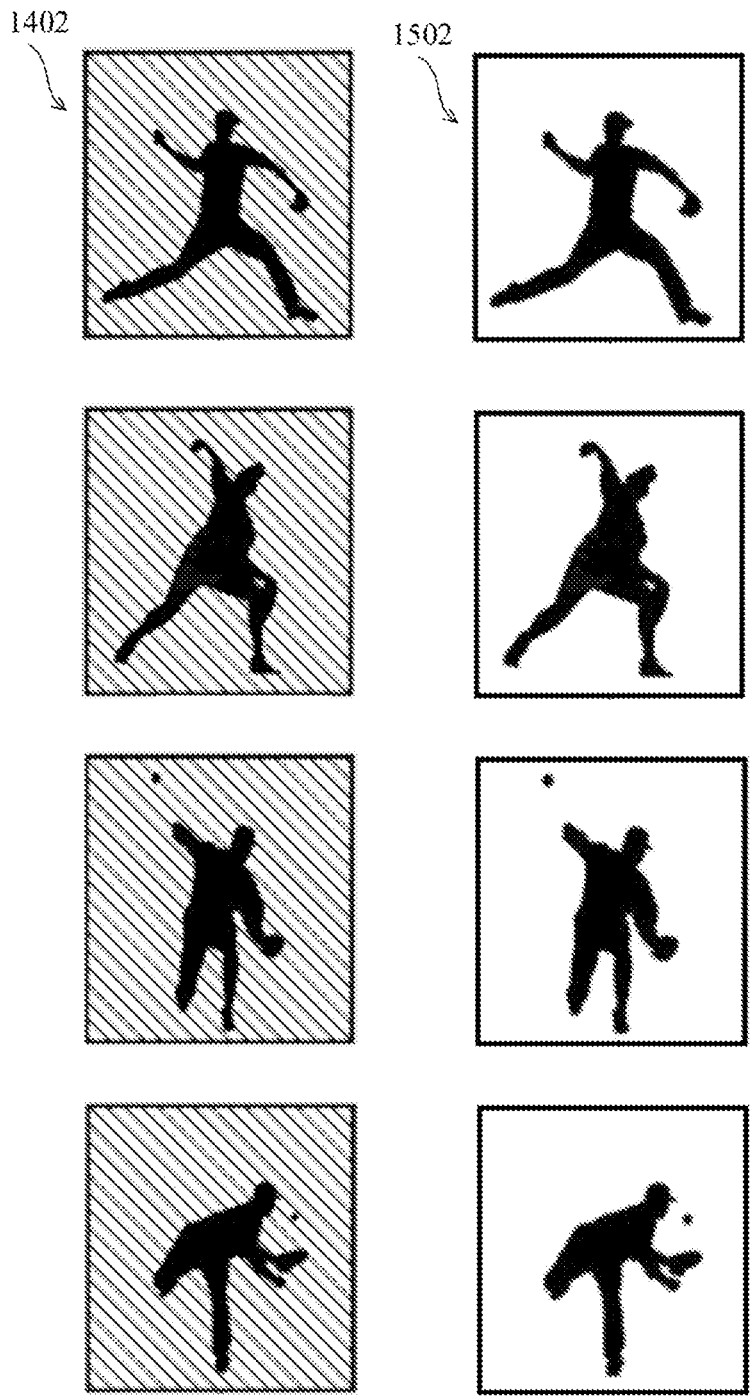
FIG. 15 is a schematic diagram illustrating a background suppression effect of the aggregated multi-scale first dimensional receptive field information obtaining module in accordance with an embodiment of the present disclosure.

FIG. 15 is a schematic diagram illustrating a background suppression effect of the aggregated multi-scale first dimensional receptive field information obtaining module 702 in accordance with an embodiment of the present disclosure. By performing the spatial pooling operation set 1102 as described with reference to FIG. 11 to obtain the spatial importance 1126, the computer vision CNN is enforced to focus on important spatial regions in the video clip that are reflected in the aggregated important and finest scale first dimensional receptive field information 1012. In the example in FIG. 15, irrelevant background in the video clip that is reflected in the input feature map sequence 1402 is represented by the shaded regions in the input feature map sequence 1402. Because the computer vision CNN is enforced to focus on the baseball and the player that are reflected in the aggregated important and finest scale first dimensional receptive field information 1012, the aggregated important and finest scale first dimensional receptive field information 1012 is represented by an aggregated important and finest scale first dimensional receptive field information 1502 in which the irrelevant background is removed.

For the aggregated important and finest scale first dimensional receptive field information 1012, with the spatial importance 1126 added to the input feature map sequence 606 as residual information, more context with different spatial scales are provided to the computer vision CNN. Therefore, an effect that the computer vision CNN has a better chance to consider more suitable context including context with at least one more suitable spatial scale at the same time when making the decision for classifying the video clip using the input feature map sequence 606 is achieved.

The temporal pooling operations 1202*a* and 1202*b* illustrated in FIG. 14 are a type of convolutional neural network operation having the spatial local to local constraint as discussed with reference to FIGS. 1A and 1B. Because for the example described with reference to FIG. 14 the aggregated temporal importance and input feature map sequence obtaining module without the aggregated multi-scale first dimensional receptive field information obtaining module 702 is used, each of the temporal pooling operations 1402*a* and 1402*b* illustrated in FIG. 14 see only corresponding collocated local spatial regions in the input feature map sequence 1402. In this way, the aggregated temporal importance and input feature map sequence obtaining module may obtain the context with the at least one more suitable temporal scale, but may not obtain context with at least one more suitable spatiotemporal scale.

Figure 16:
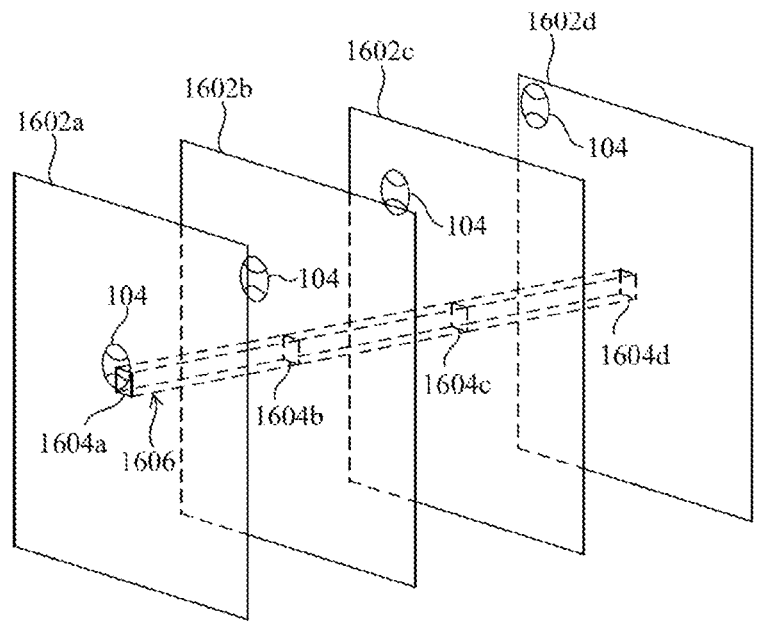
FIG. 16 is a schematic diagram illustrating context with global and finest spatial scales and important temporal scales obtained by the aggregated multi-scale first and second dimensional receptive field information obtaining module in FIG. 9 in accordance with an embodiment of the present disclosure.
Figure 16:
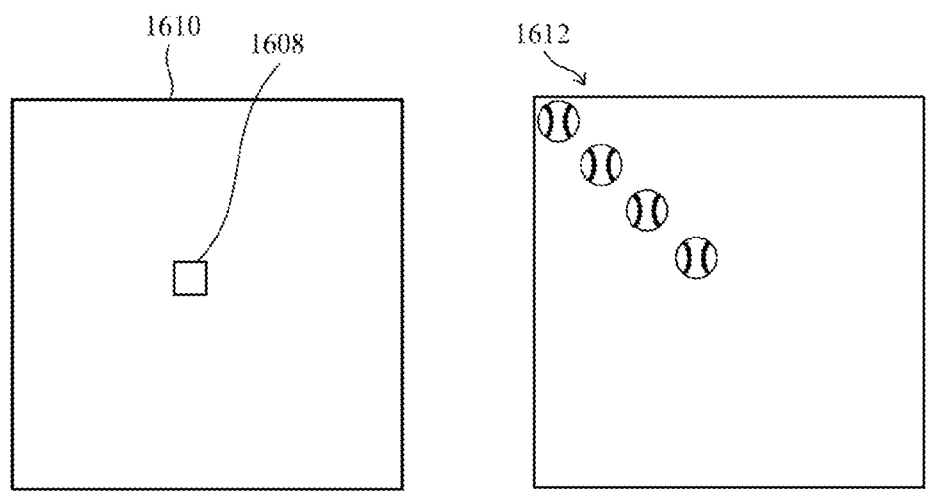

FIG. 16 is a schematic diagram illustrating context with global and finest spatial scales and important temporal scales obtained by the aggregated multi-scale first and second dimensional receptive field information obtaining module 600 in FIG. 9 in accordance with an embodiment of the present disclosure. The example in FIG. 16 follows the example in FIGS. 1A and 1B. As described above with reference to FIGS. 1A and 1B, the operation 106*b* of the first convolutional neural network operation set provides context that has a more suitable temporal scale than a temporal scale of context provided by the operation 106*a* of the first convolutional neural network operation set. Therefore, only one convolutional neural network operation 1606 that has a temporal pooling window size same as the temporal pooling window size of the operation 106*b* of the first convolutional neural network operation set is illustrated in FIG. 16. The convolutional neural network operation 1606 is an example of one of the third convolutional neural network operations performed by the multi-aggregated multi-first dimensional scale and single-second dimensional scale first and second dimensional receptive field information obtaining module 704 in the aggregated multi-scale first and second dimensional receptive field information obtaining module 600 in FIG. 9. Compared to the operation 106*b* of the first convolutional neural network operation set that is performed on the input feature map sequence 102, the convolutional neural network operation 1606 is performed on aggregated global and finest scale first dimensional receptive field feature map sequence 1602. The aggregated global and finest scale first dimensional receptive field feature map sequence 1602 illustrated in FIG. 16 is an example of the aggregated global and finest scale first dimensional receptive field information 912 in FIG. 9. In this way, even if the convolutional neural network operation 1606 has the spatial local to local constraint, a spatial portion of a spatiotemporal receptive field of the convolutional neural network operation 1606 has global and finest scales rather than a single original scale.

Take a local spatial region 1604*b* on which the convolutional neural network operation 1606 is performed due to the spatial local to local constraint as an example. Because the local spatial region 1604*b* is in one aggregated global and finest scale first dimensional receptive field feature map 1602*b* of the aggregated global and finest scale first dimensional receptive field feature map sequence 1602, when the convolutional neural network operation 1606 is performed on the local spatial region 1604*b*, the convolutional neural network operation 1606 has a finest scale (i.e. 1×1) spatial receptive field 1608 and a global scale (i.e. H×W) spatial receptive field 1610. In this way, even if the convolutional neural network operation 1606 has the spatial local to local constraint, the convolutional neural network operation 1606 is aware of the entire flying trajectory 1612 of the baseball 104 in the video frames corresponding to the aggregated global and finest scale first dimensional receptive field feature maps 1602*a*, 1602*b*, 1602*c*, and 1602*d* under the global scale. Therefore, compared to the operation 106*b* of the first convolutional neural network operation set in FIG. 1B, the convolutional neural network operation 1606 provides context with a more suitable spatiotemporal scale. The example described with reference to FIG. 14 is similar to the example described with reference to FIGS. 1A and 1B. Compared to the example described with reference to FIG. 14, the example described with reference to FIG. 16 has a following advantage. Because of awareness of the flying trajectory 1612, the context with the more suitable spatiotemporal scale provided by the convolutional neural network operation 1606 may be enhanced compared to context with the at least one more suitable temporal scale described with reference to FIG. 14. Therefore, information in the aggregated multi-scale first and second dimensional receptive field information and multi-scale first dimensional receptive field information 1304 obtained using the aggregated multi-scale first and second dimensional receptive field information obtaining module 600 in FIG. 9 that is needed for recognizing the baseball pitching action in the video clip is less than the information in the aggregated temporal importance and input feature map sequence that is needed for recognizing the baseball pitching action in the video clip. The remaining information in the aggregated multi-scale first and second dimensional receptive field information and multi-scale first dimensional receptive field information 1304 obtained using the aggregated multi-scale first and second dimensional receptive field information obtaining module 600 in FIG. 9 that is not needed for recognizing the baseball pitching action is considered as irrelevant or trivial.

Figure 17:
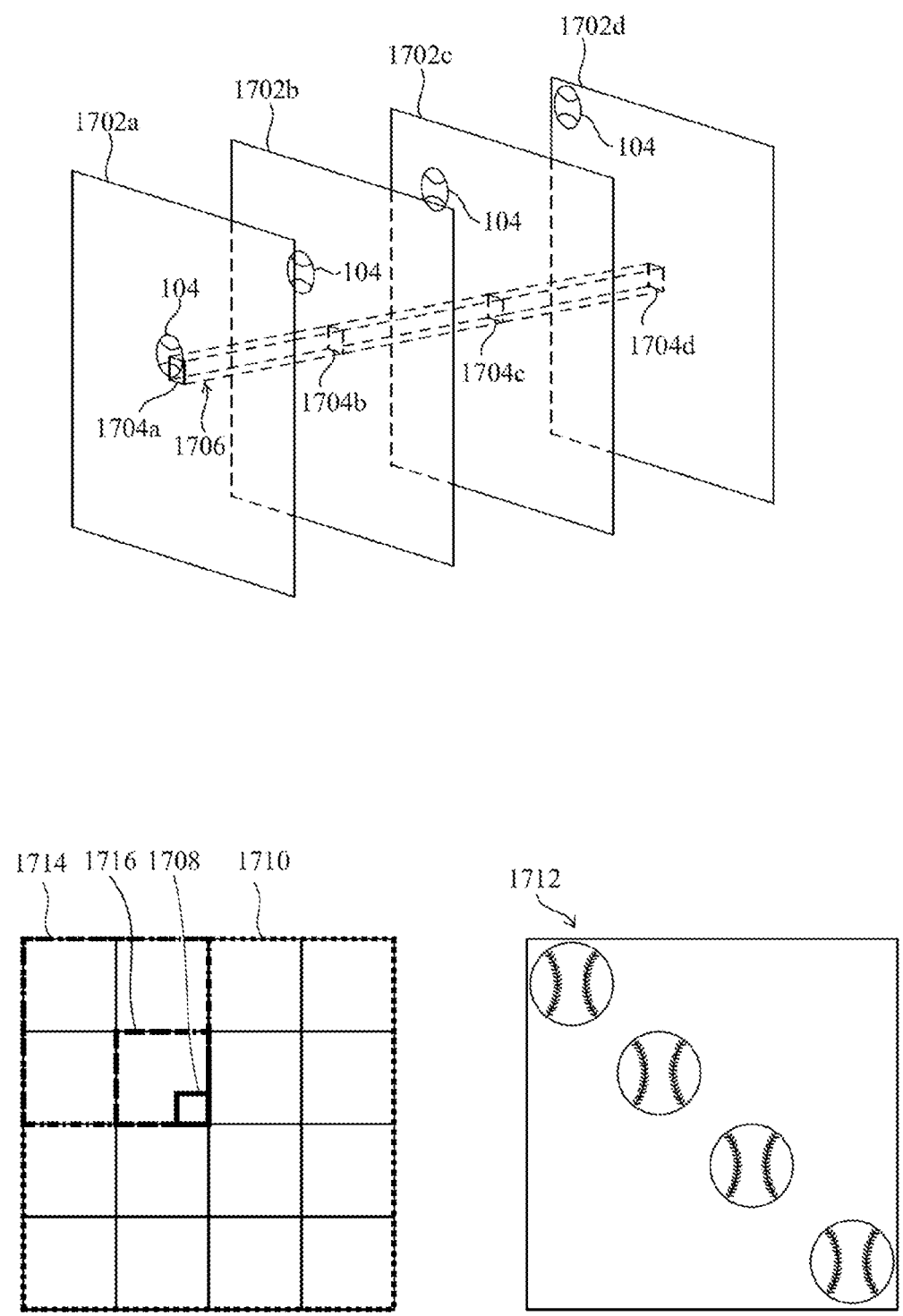
FIG. 17 is a schematic diagram illustrating context with important spatial scales and important temporal scales obtained by the aggregated multi-scale first and second dimensional receptive field information obtaining module in FIG. 10 in accordance with an embodiment of the present disclosure.

FIG. 17 is a schematic diagram illustrating context with important spatial scales and important temporal scales obtained by the aggregated multi-scale first and second dimensional receptive field information obtaining module 600 in FIG. 10 in accordance with an embodiment of the present disclosure. Because the scale of the spatial portion of the spatiotemporal receptive field of the convolutional neural network operation 1606 that allows the entire flying trajectory 1612 of the baseball 104 to be aware of is global, and the baseball 104 flies from a center of the video frame corresponding to the aggregated global and finest scale first dimensional receptive field feature map 1602a to an upper left corner of the video frame corresponding to the aggregated global and finest scale first dimensional receptive field feature map 1602d, the flying trajectory 1612 of the baseball 104 may not be viewed clearly. Compared to the convolutional neural network operation 1606 that is performed on aggregated global and finest scale first dimensional receptive field feature map sequence 1602 in FIG. 16, a convolutional neural network operation 1706 in FIG. 17 is performed on aggregated important and finest scale first dimensional receptive field feature map sequence 1702. The convolutional neural network operation 1706 is an example of one of the third convolutional neural network operations performed by the multi-aggregated multi-first dimensional scale and single-second dimensional scale first and second dimensional receptive field information obtaining module 704 in the aggregated multi-scale first and second dimensional receptive field information obtaining module 600 in FIG. 10. The aggregated important and finest scale first dimensional receptive field feature map sequence 1702 illustrated in FIG. 17 is an example of the aggregated important and finest scale first dimensional receptive field information 1012 in FIG. 10. In this way, even if the convolutional neural network operation 1606 has the spatial local to local constraint, a spatial portion of a spatiotemporal receptive field of the convolutional neural network operation 1706 has important and finest scales rather than a single original scale. The important scales may have at least one more suitable scale than the global scale.

Take a local spatial region 1704b on which the convolutional neural network operation 1706 is performed due to the spatial local to local constraint as an example. Because the local spatial region 1704b is in one aggregated important and finest scale first dimensional receptive field feature map 1702b of the aggregated important and finest scale first dimensional receptive field feature map sequence 1702, when the convolutional neural network operation 1706 is performed on the local spatial region 1704b, the convolutional neural network operation 1706 has a finest scale (i.e. 1×1) spatial receptive field 1708 and important scale (i.e. H×W, (H/2)×/2), and (H/4)×(W/4)) spatial receptive fields 1710, 1714, and 1716. In this way, even if the convolutional neural network operation 1706 has the spatial local to local constraint, the convolutional neural network operation 1706 is aware of the entire flying trajectory 1712 of the baseball 104 in the video frames corresponding to the aggregated important and finest scale first dimensional receptive field feature maps 1702a, 1702b, 1702c, and 1702d under a (H/2)×/2) scale. Therefore, compared to the operation 106b of the first convolutional neural network operation set in FIG. 1B, the convolutional neural network operation 1706 provides context with a more suitable spatiotemporal scale. Further, compared to the example described with reference to FIG. 16, the example described with reference to FIG. 17 has a following advantage. Because of awareness of the flying trajectory 1712 of the baseball 104 under the (H/2)×/2) scale, the flying trajectory 1712 of the baseball 104 is viewed more clearly. Therefore, the context provided by the convolutional neural network operation 1706 has a more suitable spatiotemporal scale than the context provided by the convolutional neural network operation 1606. Therefore, information in the aggregated multi-scale first and second dimensional receptive field information and multi-scale first dimensional receptive field information 1304 obtained using the aggregated multi-scale first and second dimensional receptive field information obtaining module 600 in FIG. 10 that is needed for recognizing the baseball pitching action in the video clip is further less than the information in the aggregated multi-scale first and second dimensional receptive field information and multi-scale first dimensional receptive field information 1304 obtained using the aggregated multi-scale first and second dimensional receptive field information obtaining module 600 in FIG. 9 that is needed for recognizing the baseball pitching action in the video clip. The remaining information in the aggregated multi-scale first and second dimensional receptive field information and multi-scale first dimensional receptive field information 1304 obtained using the aggregated multi-scale first and second dimensional receptive field information obtaining module 600 in FIG. 10 that is not needed for recognizing the baseball pitching action is considered as irrelevant or trivial.

As used here, the term "importance" or "important" refers to coarse to fine scales at least one of which provides more suitable scale for the computer vision CNN to consider irrelevant or trivial information in each frame of the video clip as irrelevant or trivial. An example of coarse to fine temporal scales are the first temporal scale and the second temporal scale provided above with reference to FIG. 14. An example of coarse to fine spatial scales are the H×W scale, the (H/2)×/2) scale, and the (H/4)×(W/4) scale provided above with reference to FIG. 17.

Figure 18:
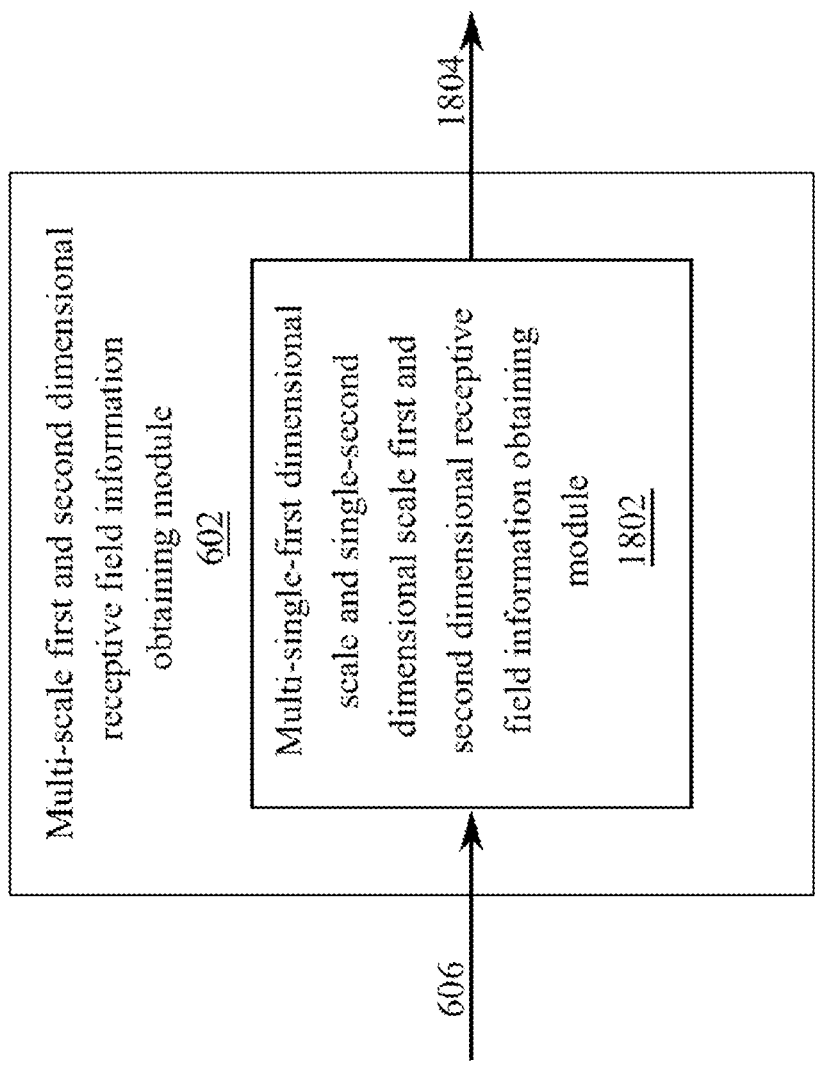
FIG. 18 is a block diagram illustrating the multi-scale first and second dimensional receptive field information obtaining module in FIG. 6 including a module in FIG. 18 in accordance with an embodiment of the present disclosure.

FIG. 18 is a block diagram illustrating the multi-scale first and second dimensional receptive field information obtaining module 602 in FIG. 6 including a module 1802 in FIG. 18 in accordance with an embodiment of the present disclosure. The multi-scale first and second dimensional receptive field information obtaining module 602 includes a multi-single-first dimensional scale and single-second dimensional scale first and second dimensional receptive field information obtaining module 1802.

The multi-single-first dimensional scale and single-second dimensional scale first and second dimensional receptive field information obtaining module 1802 is configured to performing each of a plurality of fourth convolutional neural network operations using the input feature map sequence 606 to obtain corresponding single-first dimensional scale and single-second dimensional scale first and second dimensional receptive field information 1804. Each first convolutional neural network operation set is a corresponding multiple operation set of the fourth convolutional neural network operations providing the corresponding one of the multi-scale second dimensional receptive fields, wherein each multiple operation set provides all of the multi-scale first dimensional receptive fields and the corresponding one of the multi-scale second dimensional receptive fields. The corresponding single-first dimensional scale and single-second dimensional scale first and second dimensional receptive field information 1804 for all of the fourth convolutional neural network operations is the information 608 from the multi-scale first and second dimensional receptive fields. In an embodiment, each fourth convolutional neural network operation is a corresponding 3D pooling operation.

Figure 19:
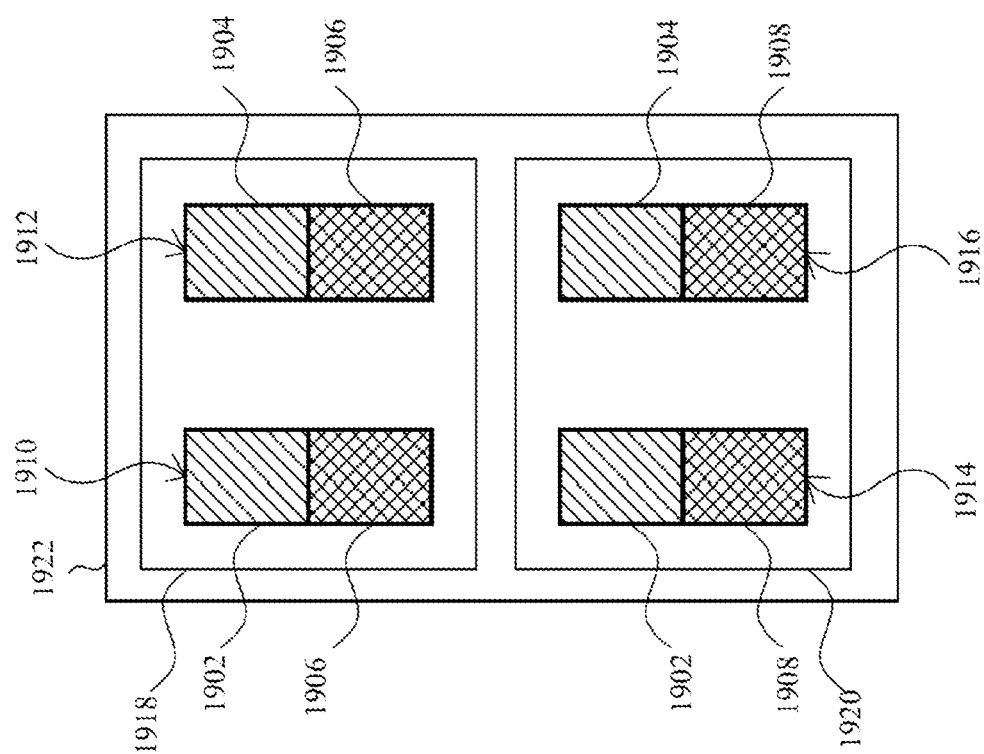
FIG. 19 is a diagram illustrating combinations of receptive fields corresponding to the steps performed by the module of the multi-scale first and second dimensional receptive field information obtaining module in FIG. 18, and the module of the aggregated multi-scale first and second dimensional receptive field information obtaining module in FIG. 6 in accordance with an embodiment of the present disclosure.

FIG. 19 is a diagram illustrating combinations of receptive fields corresponding to the steps performed by the module 1802 of the multi-scale first and second dimensional receptive field information obtaining module 602 in FIG. 18, and the module 604 of the aggregated multi-scale first and second dimensional receptive field information obtaining module 600 in FIG. 6 in accordance with an embodiment of the present disclosure. In the examples in FIGS. 18 and 19, for the multi-single-first dimensional scale and single-second dimensional scale first and second dimensional receptive field information obtaining module 1802, each of the fourth convolutional neural network operations is performed. Each of the fourth convolutional neural network operations has corresponding single-first dimensional scale and single-second dimensional scale first and second dimensional receptive field 1910, 1912, 1914, or 1916. The first and second dimensional receptive field 1910 has a single first dimensional scale portion 1902 and a single-second dimensional scale portion 1906. The first and second dimensional receptive field 1912 has a single first dimensional scale portion 1904 and the single-second dimensional scale portion 1906. The first and second dimensional receptive field 1914 has the single first dimensional scale portion 1902 and a single-second dimensional scale portion 1908. The first and second dimensional receptive field 1916 has the single first dimensional scale portion 1904 and the single-second dimensional scale portion 1908. Each first convolutional neural network operation set is the corresponding multiple operation set of the fourth convolutional neural network operations. Each multiple operation set has a corresponding combination 1918 or 1920 of all of the multi-scale first dimensional receptive fields 1902 and 1904 and each of multi-scale second dimensional receptive fields 1906 and 1908. The corresponding single-first dimensional scale and single-second dimensional scale first and second dimensional receptive field information 1910, 1912, 1914, and 1916 for all of the fourth convolutional neural network operations is the information 608 from the multi-scale first and second dimensional receptive fields.

For the multi-scale first and second dimensional receptive field information aggregating module 604, the information 608 from the multi-scale first and second dimensional receptive fields is aggregated to obtain the aggregated multi-scale first and second dimensional receptive field information 610. That is, information from the single-first dimensional scale and single-second dimensional scale first and second dimensional receptive fields 1910, 1912, 1914, and 1916 are aggregated. That is, information from a combination 1922 of the combination 1918 of all of the multi-scale first dimensional receptive fields 1902 and 1904 and one 1906 of the multi-scale second dimensional receptive fields 1906 and 1908, and the combination 1920 of all of the multi-scale first dimensional receptive fields 1902 and 1904 and another 1908 of the multi-scale second dimensional receptive fields 1906 and 1908 is aggregated.

The embodiments and the effects described reference to FIGS. 9 to 17 apply mutatis mutandis to the embodiment described with reference to FIGS. 18 to 19.

FIG. 20 is a schematic diagram illustrating the separable 3D Resnet-50 network 2000 with a plurality of aggregated multi-scale first and second dimensional receptive field information and multi-scale first dimensional receptive field information obtaining modules G1 to G2, and H1 to H3 in accordance with an embodiment of the present disclosure. In an embodiment, a type of each of the aggregated multi-scale first and second dimensional receptive field information and multi-scale first dimensional receptive field information obtaining modules G1 to G2, and H1 to H3 is the aggregated multi-scale first and second dimensional receptive field information and multi-scale first dimensional receptive field information obtaining module 1300 in FIG. 13. The separable 3D Resnet-50 network 2000 is configured to classify a video clip 2002 to obtain a classification output 2004. The separable 3D Resnet-50 network 2000 includes a plurality of stages A to F sequentially connected to one another in series. The stages B to E are similar. Each of the stages B to E is referred to as a stage X for description of common characteristics, and referred to as a corresponding stage B, . . . , or E for description of specific characteristics. The stage A includes a spatial convolutional layer A1 and a temporal convolutional layer A2 sequentially connected to each another. The stage X includes a plurality of residual blocks sequentially connected to one another. A type of each residual block of a portion of the residual blocks before the last residual block is a 3D residual block 2100 to be described with reference to FIG. 21. A type of the last residual block is a 3D residual block 2200 to be described with reference to FIG. 22. A type of each of the stages B, C, D, and E have two, three, five, and two residual blocks, respectively is the 3D residual block 2100. The stages C and D are further similar. For the stage C, the aggregated multi-scale first and second dimensional receptive field information and multi-scale first dimensional receptive field information obtaining module G1 is inserted after the residual block C1, and the corresponding aggregated multi-scale first and second dimensional receptive field information and multi-scale first dimensional receptive field information obtaining module G2 is inserted after every other residual blocks in the stage C after the aggregated multi-scale first and second dimensional receptive field information and multi-scale first dimensional receptive field information obtaining module G1. For the stage D, the aggregated multi-scale first and second dimensional receptive field information and multi-scale first dimensional receptive field information obtaining module H1 is inserted after the residual block D1, and the corresponding aggregated multi-scale first and second dimensional receptive field information and multi-scale first dimensional receptive field information obtaining module H2, . . . , or H3 is inserted after every other residual blocks in the stage D after the aggregated multi-scale first and second dimensional receptive field information and multi-scale first dimensional receptive field information obtaining module H1. The stage F includes a global average pooling layer F1 and a fully connected layer F2 sequentially connected to each another.

Compared to the above embodiment where the aggregated multi-scale first and second dimensional receptive field information and multi-scale first dimensional receptive field information obtaining modules G1 to G2, and H1 to H3 are inserted to the stages C and D in the separable 3D Resnet-50 network 2000 in a manner described above, an alternative embodiment where each of any number of aggregated multi-scale first and second dimensional receptive field information and multi-scale first dimensional receptive field information obtaining modules is inserted after any corresponding convolutional layer in any deep CNN architecture is within the contemplated scope of the present disclosure. Each aggregated multi-scale first and second dimensional receptive field information and multi-scale first dimensional receptive field information obtaining module is a lightweight but generic component for capturing first and second dimensional importance within any deep CNN architecture.

Figure 21:
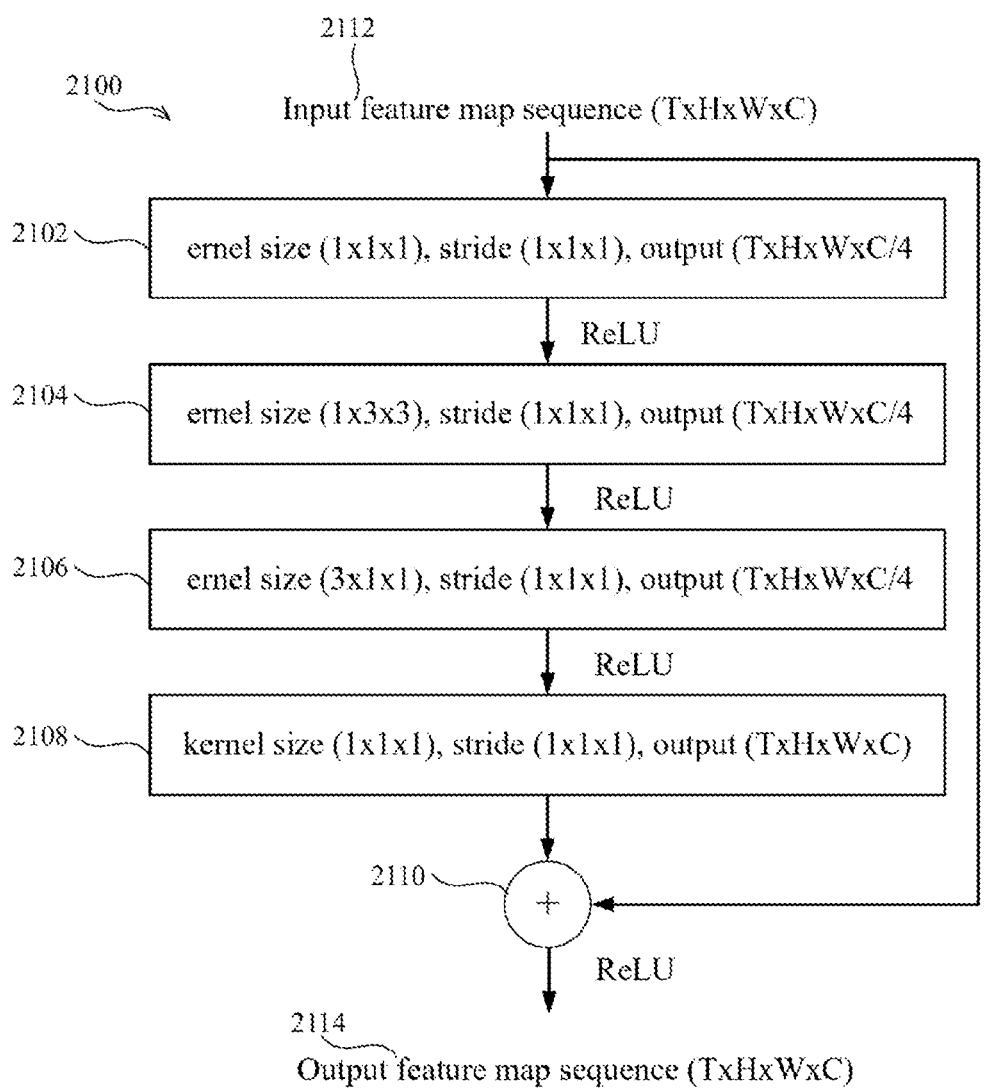
FIG. 21 is a block diagram illustrating the 3D residual block in accordance with an embodiment of the present disclosure.

FIG. 21 is a block diagram illustrating the 3D residual block 2100 in accordance with an embodiment of the present disclosure. The 3D residual block 2100 is configured to perform spatial convolution and temporal convolution using an input feature map sequence 2112 through a plurality of separate and independent convolutional layers 2102, 2104, 2106, and 2108 to obtain an output feature map sequence 2114 of the 3D residual block 2100. The 3D residual block 2100 includes the convolutional layers 2102, 2104, 2106, and 2108 and an element-wise summation operation 2110. The convolutional layers 2102, 2104, 2106, and 2108 are sequentially connected in series. The element-wise summation operation 2110 sums an output feature map sequence of the convolutional layer 2108 and the input feature map sequence 2112. The input feature map sequence 2112 has a size of T×H×W×C, where T, H, W, and C denotes the time, height, width, and channel dimensions. The convolutional layer 2102 has a kernel size of 1×1×1 and a stride of 1×1×1. An output feature map sequence of the convolutional layer 2102 has a size of T×H×W×C/4 and may be modified by a nonlinear activation function such as ReLU. The convolutional layer 2104 has a kernel size of 1×3×3 and a stride of 1×1×1. An output feature map sequence of the convolutional layer 2104 has a size of T×H×W×C/4 and may be modified by a nonlinear activation function such as ReLU. The convolutional layer 2106 has a kernel size of 3×1×1 and a stride of 1×1×1. An output feature map sequence of the convolutional layer 2106 has a size of T×H×W×C/4 and may be modified by a nonlinear activation function such as ReLU. The convolutional layer 2108 has a kernel size of 1×1×1 and a stride of 1×1×1. The output feature map sequence of the convolutional layer 2108 has a size of T×H×W×C. An output feature map sequence of the element-wise summation operation 2110 may be modified by a nonlinear activation function such as ReLU to obtain the output feature map sequence 2114 of the 3D residual block 2100. The output feature map sequence 2114 of the 3D residual block 2100 has a size of T×H×W×C.

Figure 22:
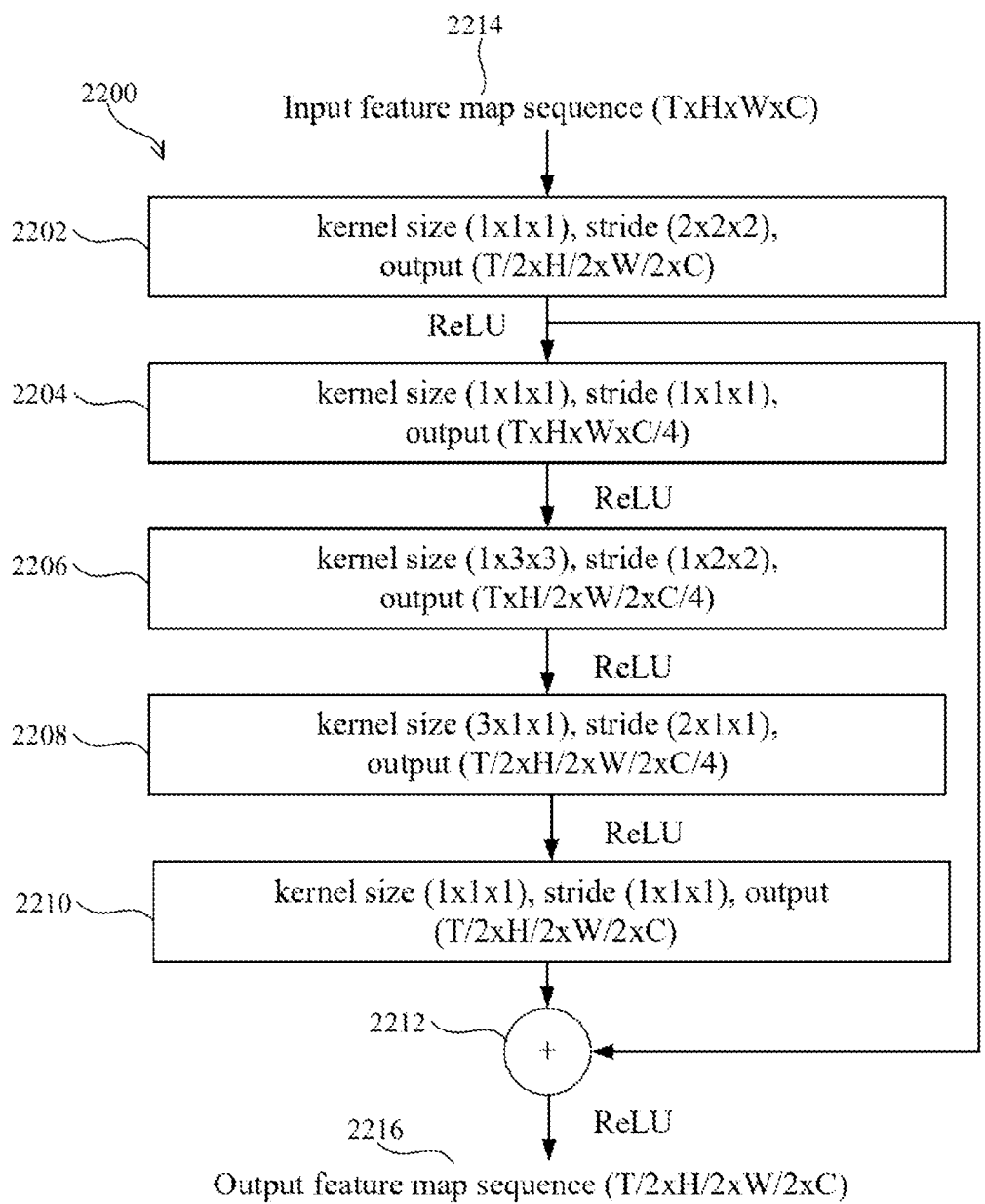
FIG. 22 is a block diagram illustrating the 3D residual block in accordance with an embodiment of the present disclosure.

FIG. 22 is a block diagram illustrating the 3D residual block 2200 in accordance with an embodiment of the present disclosure. The 3D residual block 2200 is configured to perform spatial convolution and temporal convolution with downscaling using an input feature map sequence 2214 through a plurality of separate and independent convolutional layers 2202, 2204, 2206, 2208, and 2210 to obtain an output feature map sequence 2216 of the 3D residual block 2200. The 3D residual block 2200 includes the convolutional layers 2202, 2204, 2206, 2208, and 2210 and an element-wise summation operation 2212. The convolutional layers 2202, 2204, 2206, 2208, and 2210 are sequentially connected in series. The element-wise summation operation 2212 sums an output feature map sequence of the convolutional layer 2210 and the input feature map sequence 2214. The input feature map sequence 2214 has a size of T×H×W×C, where T, H, W, and C denotes the time, height, width, and channel dimensions. The convolutional layer 2202 has a kernel size of 1×1×1 and a stride of 2×2×2. An output feature map sequence of the convolutional layer 2202 has a size of T/2×H/2×W/2×C and may be modified by a nonlinear activation function such as ReLU. The convolutional layer 2204 has a kernel size of 1×1×1 and a stride of 1×1×1. An output feature map sequence of the convolutional layer 2204 has a size of T×H×W×C/4 and may be modified by a nonlinear activation function such as ReLU. The convolutional layer 2206 has a kernel size of 1×3×3 and a stride of 1×2×2. An output feature map sequence of the convolutional layer 2206 has a size of T×H/2×W/2×C/4 and may be modified by a nonlinear activation function such as ReLU. The convolutional layer 2208 has a kernel size of 3×1×1 and a stride of 2×1×1. The convolutional layer 2210 has a kernel size of 1×1×1 and a stride of 1×1×1. The output feature map sequence of the convolutional layer 2210 has a size of T/2×H/2×W/2×C. An output feature map sequence of the element-wise summation operation 2212 may be modified by a nonlinear activation function such as ReLU to obtain the output feature map sequence 2216 of the 3D residual block 2200. The output feature map sequence 2216 of the 3D residual block 2200 has a size of T/2×H/2×W/2×C.

A person having ordinary skill in the art understands that each of the units, modules, layers, blocks, algorithm, and steps of the system or the computer-implemented method described and disclosed in the embodiments of the present disclosure are realized using hardware, firmware, software, or a combination thereof. Whether the functions run in hardware, firmware, or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, module, and unit in the above-mentioned embodiment since the working processes of the above-mentioned system, device, module, and unit are basically the same. For easy description and simplicity, these working processes will not be detailed.

It is understood that the disclosed system, device, and computer-implemented method in the embodiments of the present disclosure can be realized with other ways. The above-mentioned embodiments are exemplary only. The division of the units or modules is merely based on logical functions while other divisions exist in realization. The units or modules may or may not be physical units or modules. It is possible that a plurality of units or modules are combined or integrated into one physical unit or module. It is also possible that any of the units or modules is divided into a plurality of physical units or modules. It is also possible that some characteristics are omitted or skipped. On the other hand, the displayed or discussed mutual coupling, direct coupling, or communicative coupling operate through some ports, devices, units or modules whether indirectly or communicatively by ways of electrical, mechanical, or other kinds of forms.

The units or modules as separating components for explanation are or are not physically separated. The units or modules are located in one place or distributed on a plurality of network units or modules. Some or all of the units or modules are used according to the purposes of the embodiments. Moreover, each of the functional units or modules in each of the embodiments can be integrated in one processing unit or module, physically independent, or integrated in one processing unit or module with two or more than two units or modules.

If the software function unit or module is realized and used and sold as a product, it can be stored in a computer readable storage medium. Based on this understanding, the technical plan proposed by the present disclosure can be essentially or partially realized as the form of a software product. Or, one part of the technical plan beneficial to the conventional technology can be realized as the form of a software product. The software product is stored in a computer readable storage medium, including a plurality of commands for a processor module of a computational device (such as a personal computer, a mobile phone) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program instructions.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims

What is claimed is:

1. A computer-implemented method, applied to an electronic device capable of classifying a video clip, comprising:
    aggregating information from a corresponding combination of all of multi-scale first dimensional receptive fields and each of multi-scale second dimensional receptive fields, so that information from multi-scale first and second dimensional receptive fields corresponding to the multi-scale second dimensional receptive fields is obtained;
        wherein aggregated multi-scale first dimensional receptive field information is further obtained during the information from multi-scale first and second dimensional receptive fields corresponding to the multi-scale second dimensional receptive fields is obtained, and the aggregated multi-scale first dimensional receptive field information is obtained using first dimensional importance;
        wherein the multi-scale first dimensional receptive fields being first dimensional is being spatial and the multi-scale second dimensional receptive fields being second dimensional is being temporal, or the multi-scale first dimensional receptive fields being first dimensional is being temporal and the multi-scale second dimensional receptive fields being second dimensional is being spatial; and
        wherein a corresponding first convolutional neural network operation set provides each of the multi-scale second dimensional receptive fields and each operation of the first convolutional neural network operation set has a corresponding first dimensional local to local constraint; and
    aggregating the information from the multi-scale first and second dimensional receptive fields to obtain aggregated multi-scale first and second dimensional receptive field information, wherein the aggregated multi-scale first and second dimensional receptive field information is obtained using first and second dimensional importance;
    aggregating the aggregated multi-scale first dimensional receptive field information and the aggregated multi-scale first and second dimensional receptive field information to obtain aggregated multi-scale first and second dimensional receptive field information and multi-scale first dimensional receptive field information;
        wherein information in the aggregated multi-scale first and second dimensional receptive field information and multi-scale first dimensional receptive field information, that is not needed for classifying the video clip, is considered as irrelevant or trivial information based on the first dimensional importance and the first and second dimensional importance; and
    classifying the video clip based on the aggregated multi-scale first and second dimensional receptive field information and multi-scale first dimensional receptive field information to obtain a classification output.

2. The computer-implemented method of claim 1, wherein aggregating information from the corresponding combination of all of the multi-scale first dimensional receptive fields and each of the multi-scale second dimensional receptive fields comprises:
    performing one or more second convolutional neural network operations using an input feature map sequence to obtain the aggregated multi-scale first dimensional receptive field information,
        wherein the corresponding one or more second convolutional neural network operations provide at least one of the multi-scale first dimensional receptive fields, wherein the at least one of the multi-scale first dimensional receptive fields is larger than a smallest scale of the multi-scale first dimensional receptive fields; and
    performing each of a plurality of third convolutional neural network operations using the aggregated multi-scale first dimensional receptive field information to obtain corresponding aggregated multi-first dimensional scale and single-second dimensional scale first and second dimensional receptive field information;
        wherein each first convolutional neural network operation set is the corresponding one of the plurality of third convolutional neural network operations providing the corresponding one of the multi-scale second dimensional receptive fields; and
        wherein the corresponding aggregated multi-first dimensional scale and single-second dimensional scale first and second dimensional receptive field information for all of the plurality of third convolutional neural network operations is the information from the multi-scale first and second dimensional receptive fields.

3. The computer-implemented method of claim 2,
wherein the one or more second convolutional neural network operations comprise a plurality of second convolutional neural network operations, and the first dimensional importance is obtained by the plurality of second convolutional neural network operations.

4. The computer-implemented method of claim 3, wherein the aggregated multi-scale first dimensional receptive field information is obtained using the first dimensional importance aggregated with the input feature map sequence.

5. The computer-implemented method of claim 1, wherein the step of aggregating information from the corresponding combination of all of the multi-scale first dimensional receptive fields and each of the multi-scale second dimensional receptive fields comprises:
    performing each of a plurality of fourth convolutional neural network operations using an input feature map sequence to obtain corresponding single-first dimensional scale and single-second dimensional scale first and second dimensional receptive field information;
    wherein each first convolutional neural network operation set is a corresponding multiple operation set of the plurality of fourth convolutional neural network operations providing the corresponding one of the multi-scale second dimensional receptive fields, wherein each multiple operation set provides all of the multi-scale first dimensional receptive fields and the corresponding one of the multi-scale second dimensional receptive fields; and
    wherein the corresponding single-first dimensional scale and single-second dimensional scale first and second dimensional receptive field information for all of the plurality of fourth convolutional neural network operations is the information from the multi-scale first and second dimensional receptive fields.

6. The computer-implemented method of claim 1, wherein a corresponding pooling operation set provides the multi-scale first dimensional receptive fields and each of the multi-scale second dimensional receptive fields, wherein each pooling operation set comprises the corresponding first convolutional neural network operation set.

7. The computer-implemented method of claim 1, wherein the first and second dimensional importance is obtained using an attention map sequence mechanism.

8. A system, comprising:
a memory module configured to store program instructions;
a processor module configured to execute the program instructions, which cause the processor module to perform at least one step for classifying a video clip comprising:
    aggregating information from a corresponding combination of all of multi-scale first dimensional receptive fields and each of multi-scale second dimensional receptive fields, so that information from multi-scale first and second dimensional receptive fields corresponding to the multi-scale second dimensional receptive fields is obtained;
        wherein aggregated multi-scale first dimensional receptive field information is further obtained during the information from multi-scale first and second dimensional receptive fields corresponding to the multi-scale second dimensional receptive fields is obtained, and the aggregated multi-scale first dimensional receptive field information is obtained using first dimensional importance;
        wherein the multi-scale first dimensional receptive fields being first dimensional is being spatial and the multi-scale second dimensional receptive fields being second dimensional is being temporal, or the multi-scale first dimensional receptive fields being first dimensional is being temporal and the multi-scale second dimensional receptive fields being second dimensional is being spatial; and
        wherein a corresponding first convolutional neural network operation set provides each of the multi-scale second dimensional receptive fields and each operation of the first convolutional neural network operation set has a corresponding first dimensional local to local constraint; and
    aggregating the information from the multi-scale first and second dimensional receptive fields to obtain aggregated multi-scale first and second dimensional receptive field information, wherein the aggregated multi-scale first and second dimensional receptive field information is obtained using first and second dimensional importance;
    aggregating the aggregated multi-scale first dimensional receptive field information and the aggregated multi-scale first and second dimensional receptive field information to obtain aggregated multi-scale first and second dimensional receptive field information and multi-scale first dimensional receptive field information;
        wherein information in the aggregated multi-scale first and second dimensional receptive field information and multi-scale first dimensional receptive field information, that is not needed for classifying the video clip, is considered as irrelevant or trivial information based on the first dimensional importance and the first and second dimensional importance; and
    classifying the video clip based on the aggregated multi-scale first and second dimensional receptive field information and multi-scale first dimensional receptive field information to obtain a classification output.

9. The system of claim 8, wherein the step of aggregating information from the corresponding combination of all of the multi-scale first dimensional receptive fields and each of the multi-scale second dimensional receptive fields comprises:
    performing one or more second convolutional neural network operations using an input feature map sequence to obtain the aggregated multi-scale first dimensional receptive field information,
        wherein the corresponding one or more second convolutional neural network operation provide at least one of the multi-scale first dimensional receptive fields, wherein the at least one of the multi-scale first dimensional receptive fields is larger than a smallest scale of the multi-scale first dimensional receptive fields; and
    performing each of a plurality of third convolutional neural network operations using the aggregated multi-scale first dimensional receptive field information to obtain corresponding aggregated multi-first dimensional scale and single-second dimensional scale first and second dimensional receptive field information;
        wherein each first convolutional neural network operation set is the corresponding one of the plurality of third convolutional neural network operations providing the corresponding one of the multi-scale second dimensional receptive fields; and wherein the corresponding aggregated multi-first dimensional scale and single-second dimensional scale first and second dimensional receptive field information for all of the plurality of third convolutional neural network operations is the information from the multi-scale first and second dimensional receptive fields.

10. The system of claim 9, wherein the one or more second convolutional neural network operations comprise a plurality of second convolutional neural network operations, and the first dimensional importance is obtained by the plurality of second convolutional neural network operations.

11. The system of claim 10, wherein the aggregated multi-scale first dimensional receptive field information is obtained using the first dimensional importance aggregated with the input feature map sequence.

12. The system of claim 8, wherein the step of aggregating information from the corresponding combination of all of the multi-scale first dimensional receptive fields and each of the multi-scale second dimensional receptive fields comprises:
 performing each of a plurality of fourth convolutional neural network operations using an input feature map sequence to obtain corresponding single-first dimensional scale and single-second dimensional scale first and second dimensional receptive field information;
 wherein each first convolutional neural network operation set is a corresponding multiple operation set of the plurality of fourth convolutional neural network operations providing the corresponding one of the multi-scale second dimensional receptive fields, wherein each multiple operation set provides all of the multi-scale first dimensional receptive fields and the corresponding one of the multi-scale second dimensional receptive fields; and
 wherein the corresponding single-first dimensional scale and single-second dimensional scale first and second dimensional receptive field information for all of the plurality of fourth convolutional neural network operations is the information from the multi-scale first and second dimensional receptive fields.

13. The system of claim 8, wherein a corresponding pooling operation set provides the multi-scale first dimensional receptive fields and each of the multi-scale second dimensional receptive fields, wherein each pooling operation set comprises the corresponding first convolutional neural network operation set.

14. The system of claim 8, wherein the first and second dimensional importance is obtained using an attention map sequence mechanism.

15. A non-transitory computer-readable medium having stored program instructions, which when executed by a processor module, cause the processor module to perform steps for classifying a video clip comprising:
 aggregating information from a corresponding combination of all of multi-scale first dimensional receptive fields and each of multi-scale second dimensional receptive fields, so that information from multi-scale first and second dimensional receptive fields corresponding to the multi-scale second dimensional receptive fields is obtained;
  wherein aggregated multi-scale first dimensional receptive field information is further obtained during the information from multi-scale first and second dimensional receptive fields corresponding to the multi-scale second dimensional receptive fields is obtained, and the aggregated multi-scale first dimensional receptive field information is obtained using first dimensional importance;
 wherein the multi-scale first dimensional receptive fields being first dimensional is being spatial and the multi-scale second dimensional receptive fields being second dimensional is being temporal, or the multi-scale first dimensional receptive fields being first dimensional is being temporal and the multi-scale second dimensional receptive fields being second dimensional is being spatial; and
 wherein a corresponding first convolutional neural network operation set provides each of the multi-scale second dimensional receptive fields and each operation of the first convolutional neural network operation set has a corresponding first dimensional local to local constraint; and
 aggregating the information from the multi-scale first and second dimensional receptive fields to obtain aggregated multi-scale first and second dimensional receptive field information, wherein the aggregated multi-scale first and second dimensional receptive field information is obtained using first and second dimensional importance;
 aggregating the aggregated multi-scale first dimensional receptive field information and the aggregated multi-scale first and second dimensional receptive field information to obtain aggregated multi-scale first and second dimensional receptive field information and multi-scale first dimensional receptive field information;
  wherein information in the aggregated multi-scale first and second dimensional receptive field information and multi-scale first dimensional receptive field information, that is not needed for classifying the video clip, is considered as irrelevant or trivial information based on the first dimensional importance and the first and second dimensional importance; and
 classifying the video clip based on the aggregated multi-scale first and second dimensional receptive field information and multi-scale first dimensional receptive field information to obtain a classification output.

16. The non-transitory computer-readable medium of claim 15, wherein the step of aggregating information from the corresponding combination of all of the multi-scale first dimensional receptive fields and each of the multi-scale second dimensional receptive fields comprises:
 performing one or more second convolutional neural network operations using an input feature map sequence to obtain the aggregated multi-scale first dimensional receptive field information,
  wherein the corresponding one or more second convolutional neural network operations provide at least one of the multi-scale first dimensional receptive fields, wherein the at least one of the multi-scale first dimensional receptive fields is larger than a smallest scale of the multi-scale first dimensional receptive fields; and
 performing each of a plurality of third convolutional neural network operations using the aggregated multi-scale first dimensional receptive field information to obtain corresponding aggregated multi-first dimensional scale and single-second dimensional scale first and second dimensional receptive field information;
  wherein each first convolutional neural network operation set is the corresponding one of the plurality of third convolutional neural network operations providing the corresponding one of the multi-scale second dimensional receptive fields; and wherein the corresponding aggregated multi-first dimensional scale and single-second dimensional scale first and second dimensional receptive field information for all of the plurality of third convolutional neural network operations is the information from the multi-scale first and second dimensional receptive fields.

17. The non-transitory computer-readable medium of claim 16, wherein the one or more second convolutional neural network operations comprise a plurality of second convolutional neural network operations, and the first dimensional importance is obtained by the plurality of second convolutional neural network operations.

18. The non-transitory computer-readable medium of claim 17, wherein the aggregated multi-scale first dimensional receptive field information is obtained using the first dimensional importance aggregated with the input feature map sequence.

* * * * *